United States Patent
Tanimoto (10) Patent No.: US 12,186,947 B2
(45) Date of Patent: Jan. 7, 2025

(54) LOW-PORE PELLETS AND METHOD FOR PRODUCING MOLDED BODY

(71) Applicant: Asahi Kasei Kabushiki Kaisha, Tokyo (JP)

(72) Inventor: Kazuhiro Tanimoto, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/610,886

(22) PCT Filed: May 13, 2020

(86) PCT No.: PCT/JP2020/019146
§ 371 (c)(1),
(2) Date: Nov. 12, 2021

(87) PCT Pub. No.: WO2020/230827
PCT Pub. Date: Nov. 19, 2020

(65) Prior Publication Data
US 2022/0203585 A1 Jun. 30, 2022

(30) Foreign Application Priority Data
May 13, 2019 (JP) ................................ 2019-090819

(51) Int. Cl.
*B29C 45/00* (2006.01)
*B29B 9/14* (2006.01)
(Continued)

(52) U.S. Cl.
CPC ............ *B29C 45/0001* (2013.01); *B29B 9/14* (2013.01); *B29C 45/0005* (2013.01); *C08K 7/02* (2013.01);
(Continued)

(58) Field of Classification Search
CPC ............ B29B 9/06; B29B 9/065; B29B 9/14; B29K 2105/124; C08L 23/00–36; C08L 77/00–12; C08L 1/02; C08K 7/02
See application file for complete search history.

(56) References Cited

U.S. PATENT DOCUMENTS

| 5,288,772 A | 2/1994 | Hon |
| 2008/0146701 A1 | 6/2008 | Sain et al. |

(Continued)

FOREIGN PATENT DOCUMENTS

| EP | 0170245 A2 * | 2/1986 |
| JP | H04-122610 A | 4/1992 |

(Continued)

OTHER PUBLICATIONS

Yasim-Anuar et al., "Sustainable one-pot process for the production of cellulose nanofiber and polyethylene/cellulose nanofiber composites," J. Cleaner Production 207, 590-599 (available online Oct. 2018).*

(Continued)

*Primary Examiner* — Kregg T Brooks
(74) *Attorney, Agent, or Firm* — Morgan, Lewis & Bockius LLP (57) ABSTRACT

Provided are a pellet including a thermoplastic resin and cellulose nanofibers that enables the production of a molded body which has a good appearance in which yellowing is suppressed, and a method for producing a molded body using the same. According to one aspect, there is provided a pellet including a thermoplastic resin and cellulose nanofibers, wherein the number of pore-containing pellets per 100 pellets is 10 or less. Further, according to another aspect, there is provided a method for producing a molded body, (Continued)

which includes a step of preparing the pellets, and a step of injection molding the pellets in a mold to obtain a molded body.

14 Claims, 2 Drawing Sheets

(51) Int. Cl.
  *B29K 1/00* (2006.01)
  *B29K 105/12* (2006.01)
  *C08K 7/02* (2006.01)
  *C08L 1/02* (2006.01)

(52) U.S. Cl.
  CPC .......... *C08L 1/02* (2013.01); *B29K 2001/00* (2013.01); *B29K 2105/124* (2013.01); *C08K 2201/003* (2013.01); *C08K 2201/004* (2013.01); *C08K 2201/011* (2013.01)

(56) References Cited

U.S. PATENT DOCUMENTS

| | | |
|---|---|---|
| 2009/0118462 A1 | 5/2009 | Sato et al. |
| 2010/0173146 A1 | 7/2010 | Ihara et al. |
| 2012/0142810 A1 | 6/2012 | Buhler et al. |
| 2018/0022908 A1 | 1/2018 | Akihama et al. |
| 2018/0186970 A1* | 7/2018 | Groos ...................... C08K 5/19 |
| 2018/0201770 A1 | 7/2018 | Hamabe et al. |
| 2021/0198455 A1 | 7/2021 | Miyoshi et al. |

FOREIGN PATENT DOCUMENTS

| | | | |
|---|---|---|---|
| JP | 2000-015631 A | | 1/2000 |
| JP | 2007-290384 A | | 11/2007 |
| JP | 2010-221622 A | | 10/2010 |
| JP | 2011-006609 A | | 1/2011 |
| JP | 2011-088944 A | | 5/2011 |
| JP | 2012-117066 A | | 6/2012 |
| JP | 2013180536 A | * | 9/2013 |
| JP | 2018-016896 A | | 2/2018 |
| JP | 2018-115254 A | | 7/2018 |
| JP | 2019-056088 A | | 4/2019 |
| WO | 2007/034805 A1 | | 3/2007 |
| WO | 2018/123150 A1 | | 7/2018 |

OTHER PUBLICATIONS

International Search Report issued in corresponding International Patent Application No. PCT/JP2020/019146 dated Aug. 18, 2020.
Written Opinion issued in corresponding International Patent Application No. PCT/JP2020/019146 dated Aug. 18, 2020.
Supplementary European Search Report issued in corresponding European Patent Application No. 20806009.5 dated May 27, 2022.
International Preliminary Report on Patentability and Written Opinion issued in corresponding International Patent Application No. PCT/JP2020/019146 dated Nov. 25, 2021.
Plant Fiber Material Chemistry, 1st edition, Li Zhongzheng et al., pp. 271-272, China Light Industry Press (Jun. 30, 2012) (see partial English translation of CN OA).
"Quick Reference Manual for New Techniques and Common Parameters of Wire and Cable Production, vol. 3", 1st Edition, Zhao Mingqi, p. 949, Guangzhou Culture Audio-Visual Publishing House (Oct. 31, 2004) (see partial English translation of CN OA).
"Polypropylene—Raw Materials, Craftsmanship and Technology", 1st Edition, Hong Dingyi, pp. 574-575, China Petrochemical Press (Sep. 30, 2002) (see partial English translation of CN OA).
"Use and Maintenance of Plastic Machinery", No. 1 Edition, Geng Xiaozheng, pp. 254-255, China Light Industry Press (Aug. 31, 1998) (see partial English translation of CN OA).
Office Action issued in prosecution of Chinese Patent Application No. 202080033561.5 dated Feb. 7, 2023 (see partial English translation).

* cited by examiner

LOW-PORE PELLETS AND METHOD FOR PRODUCING MOLDED BODY

FIELD

The present invention relates to low-pore pellets, and to a method for producing a molded body using the pellets.

BACKGROUND

Conventionally, molded bodies composed mainly of thermoplastic resins have included various types of fillers for improved properties, and with increasing attention being given to environmental issues in recent years, the use of naturally derived cellulose as fillers is becoming the object of more research. For production of a molded body comprising a thermoplastic resin and cellulose, the common process is one in which a resin composition comprising a thermoplastic resin and cellulose is extruded into a strand in the molten state and cooled, and then cut with a pelletizer to form pellets, after which the pellets are remelted and shaped into the desired molded body.

One type of cellulose, cellulose nanofibers (CNF), has been the subject of attention in recent years because of their extremely fine structure, which is expected to provide excellent effects of improved physical properties for molded bodies. For production of pellets comprising a thermoplastic resin and cellulose nanofibers, PTL 1 describes a molding material mixture comprising cellulose nanofibers, and at least one base material selected from among resins and fibers, wherein a hydrophobic polymer is chemically bonded to at least some of the —OH groups of the cellulose nanofibers, and the base material and cellulose nanofibers are pulverized or pelletized.

CITATION LIST

Patent Literature

[PTL 1] Japanese Unexamined Patent Publication No. 2018-16896

SUMMARY

Technical Problem

The technology described in PTL 1 attempts to obtain a molding material mixture that prevents formation of hydrogen bonding between cellulose fibers and is stable in the form of a pulverized product or pellets, by blocking at least some of the —OH groups of the cellulose nanofibers with a hydrophobic polymer. Based on research by the present inventors, however, it has been found that when pellets are molded from a resin composition comprising a thermoplastic resin and cellulose nanofibers, voids tend to form inside the pellets (especially at the center sections), and that producing a molded body using pellets with such voids as the starting material tends to result in silver streaks on the molded body surfaces (outer appearance defects) and to also increase the yellowness index of the molded body.

It is an object of the present invention to solve this problem by providing pellets comprising a thermoplastic resin and cellulose nanofibers, wherein the pellets allow production of a molded body having a satisfactory outer appearance and reduced yellowing, as well as a method for producing a molded body using them.

Solution to Problem

As a result of diligent research directed toward solving the problems described above, the present inventors have completed this invention after finding that pellets with appropriately controlled voids allow production of a molded body with reduced outer appearance defects such as silver streaks, and reduced yellowing.

Specifically, the present invention encompasses the following aspects.

[1] Pellets of a resin composition comprising a thermoplastic resin and cellulose nanofibers, wherein the number of void-containing pellets per 100 pellets is 10 or less.

[2] Pellets according to aspect 1, wherein the ratio of the void area with respect to the cross-sectional area of the pellet TD cross-section is 4.0% or lower.

[3] Pellets according to aspect 1 or 2, wherein the number of void-containing pellets per 100 pellets is 1 or less.

[4] Pellets according to any one of aspects 1 to 3, wherein the angle formed by the normal to the cut surface of the pellets with respect to the MD direction of the pellets is 5° to 30°.

[5] Pellets according to any one of aspects 1 to 4, wherein the short diameters of the TD cross-sections of the pellets are 2 mm to 5 mm.

[6] Pellets according to any one of aspects 1 to 5, which comprise the cellulose nanofibers at 0.1 to 30 mass %.

[7] Pellets according to any one of aspects 1 to 6, wherein the cellulose nanofibers have fiber diameters of 50 to 1000 nm and a fiber length/fiber diameter (L/D) ratio of 30 or greater.

[8] Pellets according to any one of aspects 1 to 7, wherein the cellulose nanofibers are hydrophobized cellulose nanofibers.

[9] Pellets according to any one of aspects 1 to 8, wherein the thermoplastic resin is a polyamide-based resin and/or polyolefin-based resin.

[10] Pellets according to any one of aspects 1 to 9, which further comprise an elastomer.

[11] Pellets according to any one of aspects 1 to 10, which further comprise cellulose nanocrystals having diameters of 100 nm or smaller and an L/D of less than 30, or cellulose microfibers with fiber diameters of greater than 1 µm and up to 50 µm, or a mixture of the same.

[12] Pellets according to any one of aspects 1 to 11, wherein the difference Tcc−Tcp between the temperature decrease crystallization peak temperature Tcc of the resin composition measured with a differential scanning calorimeter and the temperature decrease crystallization peak temperature Tcp of the thermoplastic resin measured with a differential scanning calorimeter, is 5° C. to 30° C.

[13] Pellets according to any one of aspects 1 to 12, wherein the ratio Ve/Vc of the total volume (Ve) of pellet voids and the total volume (Vc) of the cellulose nanofibers, per 100 pellets, is 0 vol % to 4 vol %.

[14] The resin composition according to any one of aspects 1 to 13, wherein:
the resin composition further comprises a resin crystallization temperature lowering agent, and
the resin crystallization temperature lowering agent is a compound that lowers the temperature decrease crystallization peak temperature of the resin composition by 5 to 30° C. as measured with a differential scanning calorimeter.

[15] A method for producing a molded body, which comprises:
a step of preparing pellets according to any one of aspects 1 to 14, and
a step of injection molding the pellets in a mold to obtain a molded body.

Advantageous Effects of Invention

According to the invention it is possible to provide pellets comprising a thermoplastic resin and cellulose nanofibers, wherein the pellets allow production of a molded body having a satisfactory outer appearance and reduced yellowing, as well as a method for producing a molded body using them.

DESCRIPTION OF EMBODIMENTS

Exemplary modes of the present invention will now be described, with the understanding that they are not limitative on the invention.

[Pellets]

One aspect of the invention provides pellets comprising a thermoplastic resin and cellulose nanofibers. According to one aspect, the number of void-containing pellets per 100 pellets is 10 or less. The term "void-containing pellet", as used herein, refers to a pellet having at least one visible void when observed with a microscope on a TD cross-section of the pellet obtained by cutting the pellet in the TD direction (that is, the TD direction (transverse direction) when forming the pellet) at the center in the MD direction (that is, the MD direction (machine direction) when forming the pellet). Specifically, 100 randomly selected pellets are cut at the center in the MD direction of the pellets and flattened with a microtome to obtain TD cross-sections. A morphological image of the TD cross-section is photographed with a microscope at 20× magnification in a 10 mm×14 mm observation field, and pellets with visible voids are identified as void-containing pellets.

The cause of voids formed in pellets comprising a thermoplastic resin and cellulose nanofibers is believed to be that when cellulose nanofibers are mixed with a thermoplastic resin in a molten state, and a strand is formed and cooled, the cellulose nanofibers act as nucleating agents for the thermoplastic resin. Particularly when the cooling rate for the strand is high, crystallization of the thermoplastic resin, which is responsible for solidification of the strand, presumably proceeds more rapidly near the surface than inside the strand, tending to form voids inside the strands. Another cause of the voids may be that the cellulose nanofibers are able to exhibit thixotropy in the resin composition. Specifically, during production of pellets, usually with molten mixing (such as melt kneading) of the resin composition comprising a thermoplastic resin and cellulose nanofibers, followed by cooling, the shearing force on the resin composition during the melt mixing is relatively low in most cases. With such low shearing force, it is thought that the high viscosity of the resin composition due to thixotropy of the cellulose nanofibers causes formation of voids. When a molded body is produced using pellets with such voids as the molding material, the presence of air during molding is thought to result in outer appearance defects in the molded body and yellowing due to deterioration of the resin composition. Since the pellets according to one aspect of the invention have low voids, they are useful for production of a molded body with a satisfactory outer appearance and reduced yellowing.

In addition, the low number of void-containing pellets allows the indentability of the pellets to be improved and the molding cycle to be shortened during production of the molded body with the molten pellets, which is advantageous from the viewpoint of improving productivity and inhibiting decomposition of the thermoplastic resin and cellulose nanofibers.

According to one aspect, the number of void-containing pellets per 100 of the pellets comprising a thermoplastic resin and cellulose nanofibers is 10 or less, preferably 8 or less, more preferably 5 or less, even more preferably 3 or less, yet more preferably 1 or less and most preferably 0, from the viewpoint of obtaining a molded body with low outer appearance defects and yellowing. The number of void-containing pellets is preferably lower from the viewpoint of obtaining a molded body with low outer appearance defects and yellowing, but it may be 1 or more, 3 or more or 5 or more from the viewpoint of easier production of the pellets. Specifically, according to one aspect, the proportion of the number of void-containing pellets must be 10% or lower, and it is preferably 8% or lower, more preferably 5% or lower, even more 3% or lower, yet more preferably 1% or lower and most preferably 0%.

The percentage of the void area with respect to the cross-sectional area of a TD cross-section of the pellets (the void area percentage) is preferably 4.0% or lower, more preferably 2.5% or lower and even more preferably 1.0% or lower, from the viewpoint of obtaining a molded body with low outer appearance defects and yellowing. The void area percentage is the value determined by the following method. First, void-containing pellets are identified among 100 randomly selected pellets, by the method of the present disclosure. The void area for the TD cross-section of the void-containing pellets is measured using software included with the microscope, the percentage of the void area with respect to 100% as the total cross-sectional area for each TD cross-section is calculated, and the average value for all of the void-containing pellets is recorded as the void area percentage. The void area percentage is defined as 0% when not even a single void-containing pellet is present in 100 randomly selected pellets. The void area percentage is preferably lower from the viewpoint of obtaining a molded body with low defects and yellowing, and is most preferably 0%, but from the viewpoint of easier production of the pellets, it may be 0.5% or greater, 1.0% or greater or 2.0% or greater. According to a more preferred aspect, the number of void-containing pellets per 100 pellets is 8 or less, 5 or less or 3 or less, and the void area percentage is within one of the ranges specified above. According to a particularly preferred aspect, the number of void-containing pellets per 100 pellets is zero (and therefore the void area percentage is 0%).

The shapes of the pellets may be selected according to the purpose, and typical examples include spherical, ellipsoid, cylindrical and elliptic cylindrical shapes. The shapes of the pellet TD cross-sections will typically be circular (when the pellets are spherical or circular columnar) or elliptical (when the pellets are ellipsoid or elliptic cylindrical), but they may also be polygonal (triangular, quadrilateral, pentagonal or hexagonal) or variable-shaped (such as star-shaped, C-shaped or O-shaped).

According to one aspect, the short diameters of the pellet TD cross-sections may be 1 mm or greater, 2 mm or greater, 2.2 mm or greater or 2.5 mm or greater, for example, and 5 mm or lower, 4 mm or lower or 3 mm or lower, for example, from the standpoint of facilitating mass production of the pellets and molded bodies using them. For the purpose of the present disclosure, the short diameter of a pellet TD cross-section is the maximum value among possible diameters of inscribed circles that have been subtracted from the outer shape of the pellet TD cross-section (when one or more diameters exist for the shape of the pellet TD cross-section). For example, when the pellet TD cross-section is circular, the short diameter is the diameter of the circle, and when the pellet TD cross-section is elliptical, the short diameter is the short axis length of the ellipse.

As a more specific example, when the pellets are spherical or ellipsoid, the short diameters of the pellet TD cross-sections are preferably 2 mm to 5 mm. When the pellets are cylindrical or elliptic cylindrical, the short diameters of the pellet TD cross-sections are preferably 2 mm to 5 mm and the lengths in the pellet MD directions are preferably 2 mm to 5 mm. The short diameters and lengths are preferably above these specified lower limits from the viewpoint of operational stability during extrusion, and they are preferably lower than the specified upper limits from the viewpoint of seizing in the molding machine in post-working.

Figure 1:
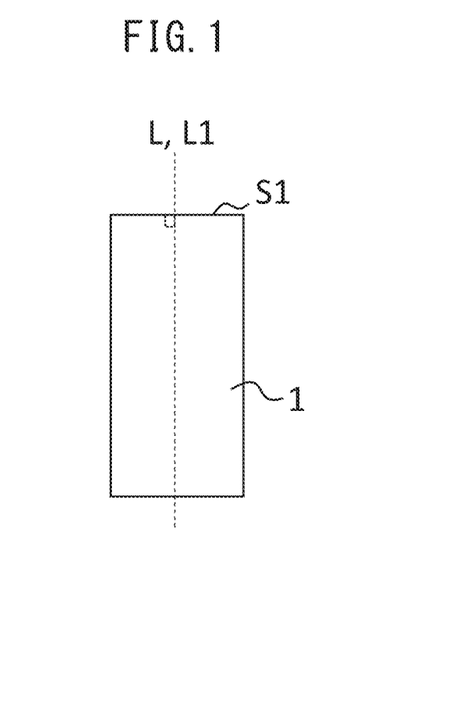
FIG. 1 is a diagram showing the cut surface of a pellet.
Figure 2:
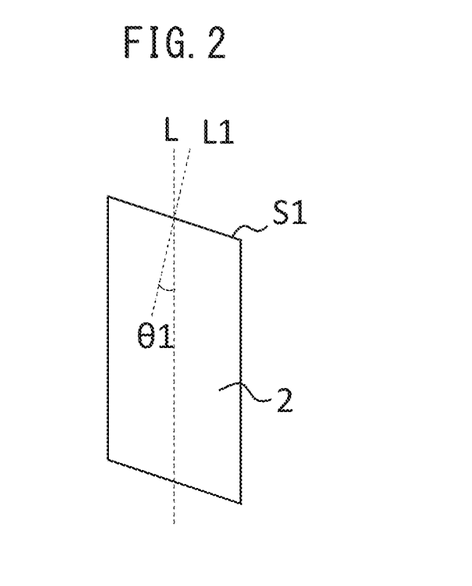
FIG. 2 is a diagram showing a mode where the pellet cut surface is slanted.
Figure 3:
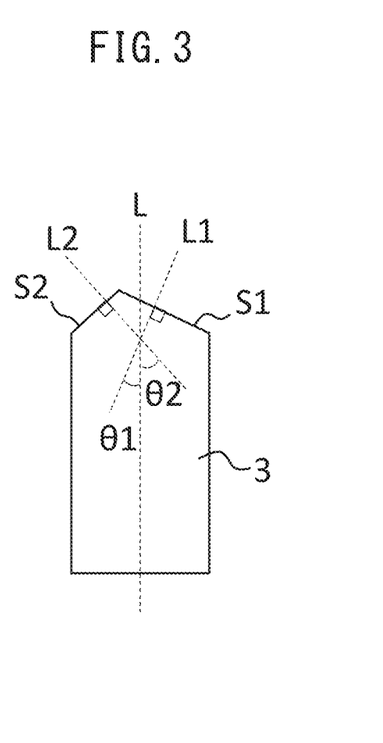
FIG. 3 is a diagram showing a mode where the pellet cut surface is slanted.

FIG. 1 is a diagram showing the cut surface of a pellet, and FIGS. 2 and 3 are diagrams showing modes where the pellet cut surface is slanted. Referring to FIG. 1, when a strand is cut into pellets 1 (i.e. pelletized), the normal direction L1 to the cut surface S1 is essentially parallel to the MD direction L of the strand in most cases. However, depending on the production conditions, such as high temperature conditions for the strand during pelletizing, the use of large-scale equipment (with a high throughput of the composition) or a high line speed, the normal direction L1, L2 may be slanted (i.e. not essentially parallel) at an angle θ1, θ2 with respect to the MD direction L of the strand (where the angle is the angle on the acute angle side), as shown in FIGS. 2 and 3. The cut surface of the pellet may be a single surface such as the cut surface S1 of the pellet shown in FIG. 2, or it may be two or more surfaces such as the cut surfaces S1, S2 of the pellet shown in FIG. 3. According to a typical aspect, the cut surface of the pellet is essentially flat.

Referring to FIGS. 2 and 3, according to one aspect the angle θ1, θ2 formed by the normal S1, S2 to the cut surface S1, S2 of the pellet with respect to the pellet MD direction L may be 5° to 30°, from the viewpoint of easier mass production of the pellets and molded bodies using them. The pellet shapes can be relatively uniformly controlled in small scale production, but are difficult to uniformly control in mass production (such as on the 100 kg/h scale). Pellets with an angle of 5° to 30° are preferred because they are easy to mass produce. The angle is more preferably 8° to 20° or 10° to 15°. The angle is the value determined by the following method. First, each of 10 randomly selected pellets is cut in a selected direction through the center section in the TD direction and in such a manner that the cut surface of the pellet is the maximum inclination angle, and then flattened with a microtome to obtain an MD cross-section. A morphological image of the MD cross-section is photographed with a microscope at 20× magnification, in a 10 mm×14 mm observation field. The pellet MD direction axis and the normal to a line segment corresponding to the edge in the pellet MD direction are traced in the morphological image, and the angle formed between the pellet MD direction axis and the normal is measured. The number-average value for the 10 pellets is calculated as the pellet cut surface inclination angle.

The pellets comprise a thermoplastic resin and cellulose nanofibers, and according to one aspect they may further comprise optional additional components. The following are examples of the components.

<Thermoplastic Resin>

The thermoplastic resin may be any of various types of resins, such as a crystalline resin with a melting point in the range of 100° C. to 350° C., or an amorphous resin with a glass transition temperature in the range of 100 to 250° C. The thermoplastic resin may be constructed of one or more different polymers, which may be homopolymers or copolymers.

The melting point of the crystalline resin referred to here is the peak top temperature of the endothermic peak appearing when the temperature is increased from 23° C. at a temperature-elevating rate of 10° C./min using a differential scanning calorimeter (DSC). When two or more endothermic peaks appear, it represents the peak top temperature of the endothermic peak that is furthest at the high-temperature end. The enthalpy of the endothermic peak is preferably 10 J/g or greater and more preferably 20 J/g or greater. During the measurement, preferably the sample is heated once to temperature conditions of melting point +20° C. or higher, and after the resin has been melted, it is cooled to 23° C. at a temperature-lowering rate of 10° C./min and used as the sample.

The glass transition temperature of the amorphous resin referred to here is the peak top temperature of the peak where the reduction in storage modulus is high and the loss modulus is maximum, during measurement with an applied frequency of 10 Hz while increasing the temperature from 23° C. at a temperature-elevating rate of 2° C./min, using a dynamic viscoelasticity measuring apparatus. When two or more loss modulus peaks appear, it represents the peak top temperature of the peak that is furthest at the high-temperature end. The measuring frequency during this time is preferably one or more times in at least 20 seconds, in order to increase the measuring precision. The method of preparing the measuring sample is not particularly restricted, but from the viewpoint of eliminating the effect of molding strain it is preferred to use a strip cut out from a hot press molded body, the size (width or thickness) of the cut out strip preferably being as small as possible, from the viewpoint of heat conduction.

The thermoplastic resin may be a polyamide-based resin, polyester-based resin, polyacetal-based resin, polycarbonate-based resin, polyacrylic-based resin, polyphenylene ether-based resin (including modified polyphenylene ethers modified by blending or graft polymerization of polyphenylene ether with other resins), polyallylate-based resin, polysulfone-based resin, polyphenylene sulfide-based resin, polyethersulfone-based resin, polyketone-based resin, polyphenylene ether ketone-based resin, polyimide-based resin, polyamideimide-based resin, polyetherimide-based resin, polyurethane-based resin or polyolefin-based resin (such as an α-olefin (co)polymer), polyvinyl-based resin or any of various ionomers.

These may be used alone or in combinations of two or more. When two or more are used in combination, they may be used as a polymer alloy. The thermoplastic resin used may be modified with one or more compounds selected from among unsaturated carboxylic acids and their acid anhydrides or derivatives.

From the viewpoint of heat resistance, moldability, design properties and mechanical properties, it is preferred to select one or more resins from the group consisting of polyolefin-based resins, polyamide-based resins, polyester-based resins, polyacetal-based resins, polyacrylic-based resins, polyphenylene ether-based resins and polyphenylene sulfide-based resins. The thermoplastic resin is preferably a polyamide-based resin and/or polyolefin-based resin, as this is particularly advantageous for the pellets of the embodiment.

The polyolefin-based resin is a polymer obtained by polymerizing a monomer unit that includes an olefin (such as an α-olefin). Specific examples of polyolefin-based resins include, but are not limited to, ethylene-based (co)polymers such as low-density polyethylene (such as linear low-density polyethylene), high-density polyethylene, ultra-low-density polyethylene and ultrahigh molecular weight polyethylene, polypropylene, poly-1-butene, poly-1-pentene, polymethylpentene, ethylene-α-olefin copolymer or their modified forms (such as ethylene-propylene copolymer and ethylene-butene copolymer, and their modified forms), copolymers of olefins (such as α-olefins) and other monomer units (for example, ethylene-(meth)acrylic acid copolymer, ethylene-methyl (meth)acrylate copolymer, ethylene-ethyl (meth)acrylate copolymer, ethylene-glycidyl methacrylate copolymer, ethylene-propylene-diene terpolymer, ethylene-vinyl acetate copolymer, copolymers of nonconjugated olefins and conjugated dienes, copolymers of ethylene and/or propylene and unsaturated carboxylic acids and/or unsaturated carboxylic acid esters, polyolefins obtained by forming metal salts with at least some of the carboxyl groups of copolymers of ethylene and/or propylene and unsaturated carboxylic acids and/or unsaturated carboxylic acid esters, and halogenated isobutylene-paramethylstyrene copolymer, and their modified forms). A polyolefin-based resin may be a cyclic olefin-based resin.

The most preferred polyolefin-based resin is polypropylene. Particularly preferred is polypropylene, which has a melt mass-flow rate (MFR) of between 3 g/10 min and 100 g/10 min, inclusive, as measured at 230° C. with a load of 2.16 kgf, according to ISO1133. The lower limit for MFR is more preferably 5 g/10 min, even more preferably 6 g/10 min and most preferably 8 g/10 min. The upper limit for MFR is more preferably 75 g/10 min, even more preferably 60 g/10 min and most preferably 40 g/10 min. The MFR preferably is not above this upper limit from the viewpoint of increased toughness of the composition, and it is preferably not less than the lower limit from the viewpoint of the flow property of the composition.

An acid-modified polyolefin-based resin may also be suitably used in order to increase the affinity with cellulose. The acid may be appropriately selected from among maleic acid, fumaric acid, succinic acid, phthalic acid and their anhydrides, or polycarboxylic acids such as citric acid. Preferred among these are maleic acid or its anhydride, for an increased modification rate. While the modification method is not particularly restricted, a common method involves heating the resin to above the melting point in the presence or in the absence of a peroxide, for melt kneading. The polyolefin resin to be acid-modified may be any of the aforementioned polyolefin-based resins, but polypropylene is most suitable for use.

The acid-modified polyolefin-based resin may be used alone, but it is preferably used in admixture with a non-modified polyolefin-based resin in order to adjust the modification rate of the composition. For example, when using a mixture of a non-modified polypropylene and an acid-modified polypropylene, the proportion of the acid-modified polypropylene is preferably 0.5 mass % to 50 mass % with respect to the total polypropylene. The lower limit is more preferably 1 mass %, even more preferably 2 mass %, yet more preferably 3 mass %, even yet more preferably 4 mass % and most preferably 5 mass %. The upper limit is more preferably 45 mass %, even more preferably 40 mass %, yet more preferably 35 mass %, even yet more preferably 30 mass % and most preferably 20 mass %. In order to maintain interfacial strength with the cellulose it is preferably higher than the lower limit, and in order to maintain ductility as a resin it is preferably lower than the upper limit.

The lower limit for the acid modification rate of the acid-modified polyolefin-based resin is preferably 0.01 mass %, more preferably 0.1 mass %, even more preferably 0.3 mass %, especially preferably 0.5 mass % and most preferably 0.7 mass %. The upper limit is preferably 10 mass %, more preferably 5 mass %, even more preferably 3 mass %, especially preferably 2 mass % and most preferably 1.5 mass %. In order to maintain interfacial strength with the cellulose it is preferably higher than the lower limit, and in order to maintain the mechanical properties of the acid-modified polyolefin it is preferably lower than the upper limit.

The melt mass-flow rate (MFR) of the acid-modified polypropylene as measured at 230° C. with a load of 2.16 kgf according to ISO1133 is preferably 50 g/10 min or higher, in order to increase affinity with the cellulose interface. A more preferred lower limit is 100 g/10 min, with 150 g/10 min being more preferred and 200 g/10 min being most preferred. There is no particular upper limit, and it may be 500 g/10 min in order to maintain mechanical strength. An MFR within this range will provide an advantage of facilitating residence at the interface between the cellulose and the resin.

Examples of preferred polyamide-based resins for the thermoplastic resin include, but are not limited to, polyamide 6, polyamide 11 and polyamide 12 obtained by polycondensation reaction of lactams, or polyamide 6,6, polyamide 6,10, polyamide 6,11, polyamide 6,12, polyamide 6,T, polyamide 6,1, polyamide 9,T, polyamide 10,T, polyamide 2M5,T, polyamide MXD,6, polyamide 6,C or polyamide 2M5,C obtained as copolymers between diamines such as 1,6-hexanediamine, 2-methyl-1,5-pentanediamine, 1,7-heptanediamine, 2-methyl-1-6-hexanediamine, 1,8-octanediamine, 2-methyl-1,7-heptanediamine, 1,9-nonanediamine, 2-methyl-1,8-octanediamine, 1,10-decanediamine, 1,11-undecanediamine, 1,12-dodecanediamine and m-xylylenediamine, and dicarboxylic acids such as butanedioic acid, pentanedioic acid, hexanedioic acid, heptanedioic acid, octanedioic acid, nonanedioic acid, decanedioic acid, benzene-1,2-dicarboxylic acid, benzene-1,3-dicarboxylic acid, benzene-1,4-dicarboxylic acid, cyclohexane-1,3-dicarboxylic acid and cyclohexane-1,4-dicarboxylic acid, as well as copolymers obtained by copolymerizing the foregoing (examples of which include polyamide 6,T/6,I).

More preferred among these polyamide-based resins are aliphatic polyamides such as polyamide 6, polyamide 11, polyamide 12, polyamide 6,6, polyamide 6,10, polyamide 6,11 and polyamide 6,12, and alicyclic polyamides such as polyamide 6,C and polyamide 2M5,C.

There are no particular restrictions on the terminal carboxyl group concentration of the polyamide-based resin, but the lower limit is preferably 20 μmol/g and more preferably 30 µmol/g. The upper limit for the terminal carboxyl group concentration is preferably 150 µmol/g, more preferably 100 µmol/g and even more preferably 80 µmol/g.

In the polyamide-based resin, the ratio of carboxy-terminal groups with respect to the total terminal groups ([COOH]/[total terminal groups]) is more preferably 0.30 to 0.95. The lower limit for the carboxy-terminal group ratio is more preferably 0.35, yet more preferably 0.40 and most preferably 0.45. The upper limit for the carboxy-terminal group ratio is more preferably 0.90, even more preferably 0.85 and most preferably 0.80. The carboxy-terminal group ratio is preferably 0.30 or greater from the viewpoint of dispersibility of the cellulose in the pellets, and it is preferably no greater than 0.95 from the viewpoint of the color tone of the obtained resin composition.

The method used to adjust the terminal group concentration of the poly amide-based resin may be a publicly known method. For example, the method may be addition of a terminal group adjuster that reacts with the terminal groups, such as a diamine compound, monoamine compound, dicarboxylic acid compound, monocarboxylic acid compound, acid anhydride, monoisocyanate, monoacid halide, monoester or monoalcohol, to the polymerization solution, so as to result in the prescribed terminal group concentration during polymerization of the polyamide.

Examples of terminal group adjusters that react with terminal amino groups include aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid and isobutyric acid; alicyclic monocarboxylic acids such as cyclohexanecarboxylic acid; aromatic monocarboxylic acids such as benzoic acid, toluic acid, α-naphthalenecarboxylic acid, β-naphthalenecarboxylic acid, methylnaphthalenecarboxylic acid and phenylacetic acid; and mixtures of any selected from among the foregoing. Among these, from the viewpoint of reactivity, stability of capped ends and cost, one or more terminal group adjusters selected from the group consisting of acetic acid, propionic acid, butyric acid, valeric acid, caproic acid, caprylic acid, lauric acid, tridecanoic acid, myristic acid, palmitic acid, stearic acid and benzoic acid are preferred, with acetic acid being most preferred.

Examples of terminal group adjusters that react with terminal carboxyl groups include aliphatic monoamines such as methylamine, ethylamine, propylamine, butylamine, hexylamine, octylamine, decylamine, stearylamine, dimethylamine, diethylamine, dipropylamine and dibutylamine; alicyclic monoamines such as cyclohexylamine and dicyclohexylamine; aromatic monoamines such as aniline, toluidine, diphenylamine and naphthylamine; and any mixtures of the foregoing. Among these, from the viewpoint of reactivity, boiling point, capped end stability and cost, it is preferred to use one or more terminal group adjusters selected from the group consisting of butylamine, hexylamine, octylamine, decylamine, stearylamine, cyclohexylamine and aniline.

The concentration of the amino terminal groups and carboxy-terminal groups is preferably determined from the integral of the characteristic signal corresponding to each terminal group, according to $^1$H-NMR, from the viewpoint of precision and convenience. The recommended method for determining the terminal group concentration is, specifically, the method described in Japanese Unexamined Patent Publication HEI No. 7-228775. When this method is used, heavy trifluoroacetic acid is useful as the measuring solvent. Also, the number of scans in $^1$H-NMR must be at least 300, even with measurement using a device having sufficient resolving power. Alternatively, the terminal group concentration can be measured by a titration method such as described in Japanese Unexamined Patent Publication No. 2003-055549. However, in order to minimize the effects of the mixed additives and lubricant, quantitation is preferably by H-NMR.

The viscosity number [VN] of the polyamide-based resin, measured in concentrated sulfuric acid at 30° C., is preferably 60 to 200 mL/g, more preferably 70 to 180 mL/g, even more preferably 70 to 140 mL/g and most preferably 70 to 120 mL/g. The polyamide-based resin with an intrinsic viscosity in this range is advantageous in that it provides a satisfactory flow property in the mold during production of the molded body by injection molding of the resin composition, allowing the molded body to have a satisfactory outer appearance.

Throughout the present disclosure, "viscosity number" refers to the index of viscosity measured according to ISO307, using 96% concentration sulfuric acid.

Preferred polyester-based resins for the thermoplastic resin are not particularly restricted but include one or more from among polyethylene terephthalate (PET), polybutylene terephthalate (PBT), polyethylene naphthalate (PEN), polybutylene succinate (PBS), polybutylene succinate adipate (PBSA), polybutylene adipate terephthalate (PBAT), polyallylate (PAR), polyhydroxyalkanoic acids (PHA) (polyester resins composed of 3-hydroxyalkanoic acids), polylactic acid (PLA) and polycarbonate (PC). Preferred polyester-based resins among these include PET, PBS, PBSA, PBT and PEN, with PBS, PBSA and PBT being more preferred.

The terminal groups of the polyester-based resin can be freely altered by the monomer ratio during polymerization and by the presence or absence and amount of stabilizer at the ends, and preferably the carboxy-terminal group ratio with respect to the total terminal groups of the polyester-based resin ([COOH]/[total terminal groups]) is 0.30 to 0.95. The lower limit for the carboxy-terminal group ratio is more preferably 0.35, yet more preferably 0.40 and most preferably 0.45. The lower limit for the carboxy-terminal group ratio is more preferably 0.90, yet more preferably 0.85 and most preferably 0.80. The carboxy-terminal group ratio is preferably 0.30 or greater from the viewpoint of dispersibility of the cellulose in the pellets, and it is preferably no greater than 0.95 from the viewpoint of the color tone of the obtained composition.

Polyacetal-based resins preferred as thermoplastic resins are commonly homopolyacetals obtained from formaldehyde starting materials and copolyacetals with trioxane as the main monomer and comprising 1,3-dioxolane, for example, as a comonomer component, and although both of these may be used, copolyacetals are preferably used from the viewpoint of thermal stability during working. The amount of comonomer component (for example, 1,3-dioxolane) is more preferably in the range of 0.01 to 4 mol %. The preferred lower limit for the comonomer component amount is 0.05 mol %, more preferably 0.1 mol % and even more preferably 0.2 mol %. The upper limit is more preferably 3.5 mol %, even more preferably 3 mol %, yet more preferably 2.5 mol % and most preferably 2.3 mol %. The lower limit is preferably in the range specified above from the viewpoint of thermal stability during extrusion and during molding, and the upper limit is preferably in the range specified above from the viewpoint of mechanical strength.

Preferred vinyl-based resins for the thermoplastic resin include vinyl aliphatic (co)polymers (polyvinyl chloride, vinyl chloride-ethylene copolymer and ethylene-vinyl acetate copolymer (which are also olefin-based resins) and their saponified forms), vinyl aromatic (co)polymers (polystyrene, conjugated diene/vinyl aromatic hydrocarbon block copolymers, and hydrogenated conjugated diene/vinyl aromatic hydrocarbon block copolymers), acrylic (co)polymers (such as poly(meth)acrylic acid esters), and acrylonitrile-based (co)polymers (such as acrylonitrile-butanediene-styrene (ABS) resin and acrylonitrile-styrene (AS) resin).

<Cellulose Nanofibers>

From the viewpoint of satisfactory dispersibility of the cellulose nanofibers in the pellets or molded body, the fiber diameters of the cellulose nanofibers are preferably 50 nm or greater, 60 nm or greater or 70 nm or greater, while from the viewpoint of a satisfactory effect of improving the physical properties of the molded body by the cellulose nanofibers, it is according to one aspect, 1000 nm or smaller, preferably 600 nm or smaller, 400 nm or smaller or 200 nm or smaller. The fiber diameter is the value determined to be the equivalent spherical diameter (volume-average particle diameter) of the particles at a cumulative volume of 50% using a laser diffraction/scattering method-based particle size distribution meter.

The fiber diameter can be measured by the following method. The cellulose nanofibers at a solid content of 40 mass % are kneaded for 30 minutes in a planetary mixer (for example, a 5DM-03-R by Shinagawa Machinery Works Co., Ltd., hook-type stirring blade) at 126 rpm, room temperature and ordinary pressure, and then a purified water suspension is prepared to 0.5 mass %, a high-shear homogenizer (for example, an "Excel ED-7 Autohomogenizer", trade name of Nippon Seiki Co., Ltd., processing conditions) is used for dispersion at rotational speed: 15,000 rpm×5 minutes, a centrifugal separator (for example, a "Model 6800 Centrifugal Separator", trade name of Kubota Corp., Rotor type Model RA-400) is used for centrifugation under conditions with a centrifugal force of 39,200 $m^2/s$ for 10 minutes, producing a supernatant, and the supernatant is centrifuged at 116,000 $m^2/s$ for 45 minutes, producing a centrifugation supernatant. The supernatant liquid is used to measure the 50% cumulative particle diameter, as the volume-average particle diameter (specifically, the equivalent spherical diameter of particles at a cumulative volume of 50% with respect to the total volume of the particles), in the volume frequency particle size distribution obtained using a laser diffraction/scattering method-based particle size distribution meter (for example, an "LA-910" or "LA-950", trade names of Horiba, Ltd., with ultrasonic treatment for 1 minute, refractive index: 1.20).

According to one aspect, the L/D ratio of the cellulose nanofibers is 30 or greater, 40 or greater, 50 or greater or 100 or greater. While the upper limit is not particularly restricted, it may be 10,000 or lower according to one aspect, from the viewpoint of handleability. The L/D ratio of the cellulose nanofibers is preferably within this range to exhibit satisfactory mechanical properties for the molded body produced using the pellets of the disclosure, using a small amount of cellulose nanofibers.

For the present disclosure, the length (L) and diameter (D) of the cellulose nanofibers, and of cellulose nanocrystals and cellulose microfibers as an optional additional component (hereunder also referred to as "cellulose component"), as well as the L/D ratio, are determined for an aqueous dispersion of the cellulose component, each being dispersed using a high-shear homogenizer (for example, an "Excel ED-7 Autohomogenizer", trade name of Nippon Seiki Co., Ltd.), under processing conditions of rotational speed: 15,000 rpm×5 minutes, diluting the aqueous dispersion with purified water to 0.1 to 0.5 mass %, casting this onto mica, and using the air-dried product as a measuring sample for measurement with an optical microscope, a high-resolution scanning microscope (SEM) or an atomic force microscope (AFM). Specifically, with the observation field adjusted to a magnification allowing observation of at least 100 cellulose component fibers, the lengths (L) and diameters (D) of 100 randomly selected cellulose component fibers are measured and the ratio (L/D) is calculated. The number-average values for 100 cellulose fibers are used for the length (L), diameter (D) and (L/D).

The cellulose nanofibers may be cellulose obtained by treating pulp, for example, with hot water or the like at 100° C. or higher, hydrolyzing the hemicellulose portion to weaken it, and then defibrating by a pulverizing method using a high-pressure homogenizer, microfluidizer, ball mill or disk mill.

According to one aspect, the cellulose nanofibers may be modified (i.e. modified cellulose nanofibers). The modified cellulose nanofibers may have the cellulose modified with one or more modifying agents selected from among esterifying agents, silylating agents, isocyanate compounds, halogenated alkylating agents, alkylene oxides and/or glycidyl compounds. According to a preferred aspect, the cellulose nanofibers are unmodified, or are modified by lacking oxoacid-modified groups (i.e. sites where the hydroxyl groups of the cellulose are converted with oxoacids (such as carboxylic acids) or their salts (such as carboxylic acid salts)), preferred examples of modified forms being forms modified with the modifying agents mentioned above. An esterifying agent used as a modifying agent includes any organic compound having at least one functional group capable of reacting with the hydroxyl groups on the surfaces of the cellulose nanofibers to esterify them. The esterification can be carried out by the method described in paragraph [0108] of International Patent Publication No. 2017/159823. The esterifying agent may be a commercially available reagent or product.

Preferred examples of esterifying agents are not particularly restricted and include aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid and isobutyric acid; alicyclic monocarboxylic acids such as cyclohexanecarboxylic acid; aromatic monocarboxylic acids such as benzoic acid, toluic acid, α-naphthalenecarboxylic acid, β-naphthalenecarboxylic acid, methylnaphthalenecarboxylic acid and phenylacetic acid; and any optionally selected mixtures of the same, as well as acid and vinyl alcohol ester compounds (such as vinyl acetate, vinyl propionate, vinyl butyrate, vinyl valerate, vinyl caproate, vinyl caprylate and vinyl laurate) and, selected from among the acids mentioned above, symmetrical anhydrides (such as acetic anhydride, maleic anhydride, cyclohexane-carboxylic acid anhydride and benzene-sulfonic acid anhydride), mixed acid anhydrides (such as butyric-valeric anhydride), cyclic anhydrides (such as succinic anhydride, phthalic anhydride, naphthalene-1,8:4,5-tetracarboxylic dianhydride and cyclohexane-1,2,3,4-tetracarboxylic 3,4-anhydride) and ester acid anhydrides (such as acetic-3-(ethoxycarbonyl)propanoic anhydride and benzoylethyl carbonate).

Preferred for use among these from the viewpoint of reactivity, stability and cost are acetic acid, propionic acid, butyric acid, valeric acid, caproic acid, caprylic acid, lauric acid, tridecanoic acid, myristic acid, palmitic acid and stearic acid, esters of these acids with vinyl alcohol, and benzoic acid, acetic anhydride, maleic anhydride, succinic anhydride and phthalic anhydride.

A silylating agent used as a modifying agent may be any Si-containing compound having at least one reactive group that can react with the hydroxyl groups on the surface of the cellulose, or groups remaining after their hydrolysis. The silylating agent may be a commercially available reagent or product.

Preferred examples of silylating agents include, but are not limited to, chlorodimethylisopropylsilane, chlorodimethylbutylsilane, chlorodimethyloctylsilane, chlorodimethyldodecylsilane, chlorodimethyloctadecylsilane, chlorodimethylphenylsilane, chloro(1-hexenyl)dimethylsilane, dichlorohexylmethylsilane, dichloroheptylmethylsilane, trichlorooctylsilane, hexamethyldisilazane, 1,3-divinyl-1,1,3,3-tetramethyldisilazane, 1,3-divinyl-1,3-diphenyl-1,3-dimethyl-disilazane, 1,3-N-dioctyltetramethyl-disilazane, diisobutyltetramethyldisilazane, diethyltetramethyldisilazane, N-dipropyltetramethyldisilazane, N-dibutyltetramethyldisilazane or 1,3-di(para-t-butylphenethyl)tetramethyldisilazane, N-trimethylsilylacetamide, N-methyldiphenylsilylacetamide, N-triethylsilylacetamide, t-butyldiphenylmethoxysilane, octadecyldimethylmethoxysilane, dimethyloctylmethoxysilane, octylmethyldimethoxysilane, octyldimethoxysilane, trimethylethoxysilane and octyltriethoxysilane.

Preferred for use among these from the viewpoint of reactivity, stability and cost are hexamethyldisilazane, octadecyldimethylmethoxysilane, dimethyloctylmethoxysilane and trimethylethoxysilane.

A halogenated alkylating agent used as a modifying agent includes any organic compound having at least one functional group capable of reacting with the hydroxyl groups on the surfaces of cellulose to form alkyl halides. The halogenated alkylating agent used may be a commercially available reagent or product.

Preferred examples of halogenated alkylating agents are not particularly restricted and include chloropropane, chlorobutane, bromopropane, bromohexane, bromoheptane, iodomethane, iodoethane, iodooctane, iodooctadecane and iodobenzene. Preferred for use among these from the viewpoint of reactivity, stability and cost are bromohexane and iodooctane.

An isocyanate compound used as a modifying agent includes any organic compound having at least one isocyanate group capable of reacting with the hydroxyl groups on the surface of cellulose. The isocyanate compound may be a blocked isocyanate compound that allows the blocking groups to dissociate at a specific temperature to regenerate isocyanate groups, or a polyisocyanate dimer or trimer, or a modified isocyanate biuret or polymethylene polyphenyl polyisocyanate (polymeric MDI). They may be commercially available reagents or products.

Preferred examples of isocyanate compounds include, but are not limited to, aliphatic polyisocyanates, alicyclic polyisocyanates, aromatic polyisocyanates, aromatic-aliphatic polyisocyanates and blocked isocyanate compounds and polyisocyanates. Examples include tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, 3-methylpentane-1,5-diisocyanate, isophorone diisocyanate, hydrogenated xylylene diisocyanate, 4,4'-dicyclohexylmethane diisocyanate, 1,4-cyclohexane diisocyanate, methylcyclohexylene diisocyanate, 1,3-bis(isocyanatomethyl)cyclohexane), tolylene diisocyanate (TDI), 2,2'-diphenylmethane diisocyanate, 2,4'-diphenylmethane diisocyanate, 4,4'-diphenylmethane diisocyanate (MDI), 4,4'-dibenzyl diisocyanate, 1,5-naphthylene diisocyanate, xylylene diisocyanate, 1,3-phenylene diisocyanate, 1,4-phenylene diisocyanate), dialkyldiphenylmethane diisocyanates, tetraalkyldiphenylmethane diisocyanates, α,α,α,α-tetramethylxylylene diisocyanate, and blocked isocyanate compounds obtained by reacting these isocyanate compounds with oxime-based blocking agents, phenol-based blocking agents, lactam-based blocking agents, alcohol-based blocking agents, activated methylene-based blocking agents, amine-based blocking agents, pyrazole-based blocking agents, bisulfite-based blocking agents or imidazole-based blocking agents.

Preferred for use among these from the viewpoint of reactivity, stability and cost are TDI, MDI, hexamethylene diisocyanate, and blocked isocyanates obtained using hexamethylene diisocyanate-modified compounds and hexamethylene diisocyanate as starting materials.

The dissociation temperature of the blocking groups of these blocked isocyanate compounds is at maximum preferably 210° C., more preferably 190° C. and even more preferably 150° C., from the viewpoint of reactivity and stability. The minimum is preferably 70° C., more preferably 80° C. and even more preferably 110° C. Blocking agents with blocking group dissociation temperatures in this range include methyl ethyl ketone oxime, ortho-secondary butylphenol, caprolactam, sodium bisulfite, 3,5-dimethylpyrazole and 2-methylimidazole.

An alkylene oxide and/or glycidyl compound used as a modifying agent may be any organic compound having at least one alkylene oxide, glycidyl and/or epoxy group capable of reacting with the hydroxyl groups on the surface of cellulose. The alkylene oxide and/or glycidyl compound may be a commercially available reagent or product.

Preferred examples of alkylene oxide and/or glycidyl compounds include, but are not limited to, glycidyl ethers such as methyl glycidyl ether, ethyl glycidyl ether, butyl glycidyl ether, 2-ethylhexyl glycidyl ether, 2-methyloctyl glycidyl ether, phenyl glycidyl ether, p-tertiary butylphenyl glycidyl ether, sec-butylphenyl glycidyl ether, n-butylphenyl glycidyl ether, phenylphenol glycidyl ether, cresyl glycidyl ether and dibromocresyl glycidyl ether; glycidyl esters such as glycidyl acetate and glycidyl stearate; and polyhydric alcohol glycidyl ethers such as ethyleneglycol diglycidyl ether, propyleneglycol diglycidyl ether, 1,4-butanediol diglycidyl ether, hexamethyleneglycol diglycidyl ether, resorcinol diglycidyl ether, bisphenol A diglycidyl ether, polyethyleneglycol diglycidyl ether, polypropyleneglycol diglycidyl ether, polybutyleneglycol diglycidyl ether, glycerol triglycidyl ether, trimethylolpropane-triglycidyl ether, pentaerythritol tetraglycidyl ether, sorbitol polyglycidyl ether, sorbitan polyglycidyl ether, polyglycerol polyglycidyl ether and diglycerol polyglycidyl ether.

Preferred for use among these from the viewpoint of reactivity, stability and cost are 2-methyloctyl glycidyl ether, hexamethyleneglycol diglycidyl ether and pentaerythritol tetraglycidyl ether.

According to one aspect, the cellulose nanofibers are hydrophobized cellulose nanofibers. The modifying agents mentioned above may be suitably used for production of hydrophobized cellulose nanofibers. The hydrophobized cellulose fibers are preferably acetylated cellulose nanofibers.

From the viewpoint of obtaining a satisfactory effect of improving the physical properties of the molded body by the cellulose nanofibers, the content of the cellulose nanofibers in the pellets is preferably 0.1 mass % or greater, more preferably 1 mass % or greater, even more preferably 3 mass % or greater and most preferably 5 mass % or greater, while from the viewpoint of satisfactorily maintaining dispersibility of the cellulose nanofibers in the pellets or molded body to satisfactorily obtain the desired effect of improving the physical properties by the cellulose nanofibers, and also the viewpoint of production cost, it is preferably 30 mass % or lower, more preferably 20 mass % or lower and even more preferably 10 mass % or lower.

<Additional Components>

The pellets may also include optional additional components in addition to the thermoplastic resin and cellulose nanofibers. Additional components include cellulose nanocrystals, cellulose microfibers, elastomers, surface treatment agents, compatibilizers, plasticizers, coloring agents, pigments, flow adjusters, antioxidants, ultraviolet absorbers, ultraviolet dispersing agents, inorganic fillers and lubricant oils. Each of the components may be used alone, or in combinations of two or more. They may also be either commercially available reagents or products.

<Cellulose Nanocrystals and Cellulose Microfibers>

According to a preferred aspect, the additional component includes cellulose nanocrystals having a diameter of 100 nm or smaller and an L/D of less than 30, or cellulose microfibers with fiber diameters of greater than 1 μm and up to 50 μm, or a mixture of the same.

According to one aspect, the diameters of the cellulose nanocrystals are 100 nm or smaller, 80 nm or smaller or 70 nm or smaller, and according to another aspect they are 3 nm or larger, 5 nm or larger or 10 nm or larger. According to one aspect, the L/D ratio of the cellulose nanocrystals is less than 30, 20 or less, 15 or less or 10 or less, and according to another aspect it is 1 or greater, 2 or greater, 4 or greater or 5 or greater.

According to one aspect, the fiber diameters of the cellulose microfibers are larger than 1 μm, 2 μm or larger, 5 μm or larger or 10 μm or larger, and according to another aspect they are 50 μm or smaller, 45 μm or smaller, 40 μm or smaller, 30 μm or smaller, 20 μm or smaller, or 15 μm or smaller. According to one aspect, the L/D ratio of the cellulose microfibers is 30 or greater, 50 or greater or 70 or greater, and according to another aspect it is 2000 or less, 1000 or less or 500 or less.

According to one aspect, the cellulose nanocrystals and/or cellulose microfibers may be modified. Examples of modification are the same as described above for cellulose nanofibers.

<Elastomer>

For the present disclosure, "elastomer" means a substance (specifically, a natural or synthetic polymer substance) that is an elastic solid at room temperature (23° C.). Specific examples of elastomers include natural rubber, conjugated diene compound polymers, aromatic compound-conjugated diene copolymers, hydrogenated aromatic compound-conjugated diene copolymers, polyolefin-based elastomers, polyester-based elastomers, polyurethane-based elastomers, polyamide-based elastomers and elastomers with core-shell structures. According to one aspect, the elastomer is a different type of polymer than the thermoplastic resin. From the viewpoint of facilitating the modification reaction in order to obtain an elastomer with acidic functional groups as described below, an aromatic compound-conjugated diene copolymer, a hydrogenated aromatic compound-conjugated diene copolymer, a polyolefin-based elastomer or an elastomer with a core-shell structure is preferred. More preferred among aromatic compound-conjugated diene copolymers and hydrogenated aromatic compound-conjugated diene copolymers are aromatic compound-conjugated diene block copolymers and hydrogenated aromatic compound-conjugated diene block copolymers, and more preferred among polyolefin-based elastomers are copolymers of ethylene and α-olefins.

The aromatic compound-conjugated diene block copolymer referred to here is a block copolymer composed of a polymer block (A) of which an aromatic vinyl compound is the major component, and a polymer block (B) of which a conjugated diene compound is the major component. Block copolymers in which the bonding form of each block is an AB type, ABA type or ABAB type are preferred from the viewpoint of exhibiting impact strength, with ABA and ABAB types being more preferred.

The mass ratio of the aromatic vinyl compound and conjugated diene compound in the block copolymer is preferably 10/90 to 70/30. It is more preferably 15/85 to 55/45, and most preferably 20/80 to 45/55. Two or more copolymers with different mass ratios between the aromatic vinyl compound and conjugated diene compound may also be used as a blend. Specific examples of aromatic vinyl compounds include styrene, α-methylstyrene and vinyltoluene, any one or more of which may be selected for use, with styrene being especially preferred.

Specific examples of conjugated diene compounds include butadiene, isoprene, piperylene and 1,3-pentadiene, any one or more of which may be selected for use, with butadiene, isoprene and their combinations being preferred. When butadiene is used as the conjugated diene compound of the block copolymer, the microstructure of the polybutadiene block portion has a total for the 1,2-vinyl content, 1,2-vinyl content and 3,4-vinyl content of preferably 5 to 80%, more preferably 10 to 50% and most preferably 15 to 40%, based on molar content, from the viewpoint of inhibiting crystallization of the soft segment.

A hydrogenated block copolymer of an aromatic vinyl compound and conjugated diene compound is one wherein the aliphatic double bonds in the polymer blocks consisting mainly of the diene compound are controlled to the range of greater than 0% and up to 100%, by hydrogenation of a block copolymer of an aromatic vinyl compound and conjugated diene compound. From the viewpoint of inhibiting heat degradation during processing, the degree of hydrogenation of the hydrogenated block copolymer is preferably 50% or greater, more preferably 80% or greater and most preferably 98% or greater.

The molecular weights of the block copolymer of the aromatic vinyl compound and conjugated diene compound and its hydrogenated form are each a number-average molecular weight (Mn) of 10,000 to 500,000 and most preferably 40,000 to 250,000, from the viewpoint of both impact strength and flow property. The "number-average molecular weight" referred to here is the value measured with a GPC apparatus using a chloroform elution solvent at a measuring temperature of 40° C., and converted in terms of polystyrene standard polymer.

The aromatic vinyl compound-conjugated diene compound block copolymers may also be used in combinations of two or more having different bonding forms, different molecular weights, different aromatic vinyl compound types, different conjugated diene compound types, different totals for the 1,2-vinyl content, 1,2-vinyl content and 3,4-vinyl content, different aromatic vinyl compound component contents and different hydrogenation rates.

An ethylene-α-olefin copolymer is preferred for use as the polyolefin-based elastomer from the viewpoint of exhibiting impact resistance. Monomers to be copolymerized with the ethylene unit include aliphatic-substituted vinyl monomers such as propylene, butene-1, pentene-1,4-methylpentene-1, hexene-1, heptene-1, octene-1, nonene-1, decene-1, undecene-1, decene-1, tridecene-1, tetradecene-1, pentadecene-1, hexadecene-1, heptadecene-1, octadecene-1, nonadecene-1 and eicosene-1, isobutylene, aromatic vinyl monomers such as styrene and substituted styrene, esteric vinyl monomers such as vinyl acetate, acrylic acid ester, methacrylic acid ester, glycidylacrylic acid ester, glycidylmethacrylic acid ester and hydroxyethylmethacrylic acid ester, nitrogen-containing vinyl monomers such as acrylamide, allylamine, vinyl-p-aminobenzene, acrylonitrile, and dienes such as butadiene, cyclopentadiene, 1,4-hexadiene and isoprene.

The copolymer is preferably a copolymer of ethylene and one or more α-olefins of 3 to 20 carbon atoms, more preferably a copolymer of ethylene and one or more α-olefins of 3 to 16 carbon atoms, and most preferably a copolymer of ethylene and one or more α-olefins of 3 to 12 carbon atoms. From the viewpoint of exhibiting impact resistance, the molecular weight of the ethylene-α-olefin copolymer is a number-average molecular weight (Mn) of preferably 10,000 or higher, more preferably 10,000 to 100,000 and even more preferably 20,000 to 60,000, measured with a gel permeation chromatography apparatus using 1,2,4-trichlorobenzene as the solvent, at 140° C. in terms of standard polystyrene. From the viewpoint of both flow property and impact resistance, the molecular weight distribution (weight-average molecular weight/number-average molecular weight: Mw/Mn) is preferably 3 or lower, and more preferably 1.8 to 2.7.

From the viewpoint of handleability during processing, the preferred ethylene unit content for the ethylene-α-olefin copolymer is 30 to 95 mass % with respect to the total amount of the ethylene-α-olefin copolymer.

These preferred ethylene-α-olefin copolymers can be produced by the methods described in Japanese Examined Patent Publication HEI No. 4-12283, Japanese Unexamined Patent Publication SHO No. 60-35006, Japanese Unexamined Patent Publication SHO No. 60-35007, Japanese Unexamined Patent Publication SHO No. 60-35008, Japanese Unexamined Patent Publication HEI No. 5-155930, Japanese Unexamined Patent Publication HEI No. 3-163088 or U.S. Pat. No. 5,272,236, for example.

For the purpose of the disclosure, elastomers having a core-shell structure include core-shell type impact-resistant modifying agents having a core of particulate rubber and a shell of a glass graft layer formed around the exterior of the core. The component of the rubber core is preferably butadiene-based rubber, acrylic rubber or silicone-acrylic composite rubber. A vitreous polymer such as styrene resin, acrylonitrile-styrene copolymer or acrylic resin is preferably used for the shell. When the thermoplastic resin is a polyamide-based resin, for example, it is preferred to use an elastomer having a core-shell structure with a butadiene rubber core and an acrylic-based resin shell, from the viewpoint of compatibility with the polyamide.

According to one aspect, the elastomer has an acidic functional group as at least a portion of the elastomer. That the elastomer has an acidic functional group, for the purpose of the disclosure, means that an acidic functional group has been added via chemical bonding into the molecular skeleton of the elastomer. An "acidic functional group", for the purpose of the disclosure, means a functional group that can react with a basic functional group, and specific examples include hydroxyl, carboxyl, carboxylate, sulfo, and acid anhydride groups. At least a portion of the elastomer preferably has an acidic functional group for increased affinity between the elastomer and cellulose nanofibers.

When the elastomer has an acidic functional group, the amount of the acidic functional group added to the elastomer is preferably 0.01 mass % or greater, more preferably 0.1 mass % or greater and even more preferably 0.2 mass % or greater, and preferably 5 mass % or lower, more preferably 3 mass % or lower and even more preferably 2 mass % or lower, based on 100 mass % of the elastomer, from the viewpoint of affinity with the cellulose nanofibers. The number of acidic functional groups is the value obtained by measuring the sample against a calibration curve drawn using the characteristic absorption band for the acid, after measuring a calibration sample premixed with the acidic substance using an infrared absorption spectrometer.

Elastomers with acidic functional groups include elastomers having a core-shell structure wherein the shell is a layer formed using a copolymerizing component such as acrylic acid, and elastomers which are modified by grafting α,β-unsaturated dicarboxylic acids or their derivatives onto ethylene-α-olefin copolymers, polyolefins, aromatic compound-conjugated diene copolymers or hydrogenated aromatic compound-conjugated diene copolymers that include acrylic acid as a monomer, either in the presence or in the absence of a peroxide.

According to a preferred aspect, the elastomer is an elastomer modified with an acid anhydride.

More preferred among these are modified forms with α,β-unsaturated dicarboxylic acids or their derivatives grafted onto polyolefin-based elastomers, aromatic compound-conjugated diene copolymers or hydrogenated aromatic compound-conjugated diene copolymers, either in the presence or in the absence of a peroxide, and particularly preferred are modified forms with α,β-unsaturated dicarboxylic acids or their derivatives grafted onto ethylene-α-olefin copolymers or hydrogenated aromatic compound-conjugated diene block copolymers, either in the presence or in the absence of a peroxide.

Specific examples of α,β-unsaturated dicarboxylic acids and their derivatives include maleic acid, fumaric acid, maleic anhydride and fumaric anhydride, with maleic anhydride being particularly preferred.

When an elastomer has an acidic functional group, the elastomer may be a mixture of an elastomer with an acidic functional group and an elastomer without an acidic functional group. The mixing ratio of the elastomer with an acidic functional group and the elastomer without an acidic functional group is preferably 10 mass % or greater, more preferably 20 mass % or greater, even more preferably 30 mass % or greater and most preferably 40 mass % or greater, where 100 mass % is the total of both, from the viewpoint of satisfactorily maintaining high toughness and stable physical properties for the resin composition by the elastomer with an acidic functional group. There is no particular upper limit, and essentially all of the elastomer may be an elastomer with an acidic functional group, but from the viewpoint of avoiding flow property issues it is preferably 80 mass % or lower.

The amount of elastomer in the resin composition is preferably in the range of 1 to 50 parts by mass with respect to 100 parts by mass of the thermoplastic resin. The upper limit is more preferably 40 parts by mass, even more preferably 35 parts by mass, yet more preferably 30 parts by mass and most preferably 25 parts by mass. It is preferred to be below this upper limit in order to satisfactorily maintain the rigidity and heat resistance of the resin composition. The lower limit is preferably 2 parts by mass, more preferably 3 parts by mass, even more preferably 4 parts by mass and most preferably 5 parts by mass. It is preferred to be above this lower limit in order to increase the toughness and physical property stability of the resin composition.

When the elastomer phase forms a particulate dispersed phase (dispersed particles) in the resin composition, the dispersed particle diameter is preferably 3 µm or smaller, more preferably 2 µm or smaller and most preferably 1 µm or smaller, as the number-mean particle size. There is no particular lower limit, but it may be 0.1 µm, for example. This range is preferred from the viewpoint of high toughness and physical property stability.

The elastomer preferably has a highly uniform dispersed particle diameter. From the same viewpoint, the volume ratio of dispersed particles with particle diameters of 1 µm or larger among the total dispersed particles of the elastomer is preferably 30 vol % or lower. The upper limit is more preferably 25 vol %, even more preferably 20 vol %, yet more preferably 15 vol % and most preferably 10 vol %. If coarse particles are present even in very small amounts in the dispersed particle diameter distribution based on volume, then the volume ratio of dispersed particles with particle diameters of 1 µm or larger increases drastically. The volume ratio is preferably within this range for high uniformity of the dispersed particle diameters. The volume ratio may be 2 vol % or higher or 5 vol % or higher, for example, from the viewpoint of facilitating production of the resin composition.

The method for increasing the uniformity of dispersed particle diameters in the elastomer may be a method of producing a resin composition by extrusion kneading of the compounding ingredients for the resin composition, and increasing the screw rotational speed during extrusion kneading to form high shear strain in the compounding ingredients, for microdispersion of the elastomer, such as a method of setting screw parts at even narrow clearances, known as seal rings, to produce stretch flow strain in the compounding ingredients, or a method of passing a special narrow slit through the molten polymer to produce a stretch flow strain at the slit, and although any of these methods may be used, methods using stretch flow strain are preferred because methods that introduce high shear also notably increase the polymer temperature during processing.

The method for observing the dispersed state may be a method of cutting the resin composition in a form such as a molded body or pellets into ultrathin sections and dyeing the thermoplastic resin phase using phosphotungstic acid or the like, and then observing it with a transmission electron microscope, or a method of uniformly exposing the surface of the resin composition in a form such as a molded body or pellets and then dipping it in a solvent that selectively dissolves only the elastomer, extracting the elastomer, and observing it with a scanning electron microscope. The obtained image may be binarized with an image analyzer, the diameters of dispersed particles (at least 500 randomly selected particles) in the dispersed phase may be converted to circle equivalent diameters, and each of the particle diameters may be counted, thereby allowing calculation of the number-mean particle size of the dispersed particles and the volume ratio of particles with predetermined particle diameters (for example, particle diameters of 1 µm or greater).

<Surface Treatment Agent>

Preferred examples for the surface treatment agent include compounds having a hydrophilic segment and a hydrophobic segment in the molecule, and more specifically copolymers obtained using one or more from among compounds that provide hydrophilic segments (for example, polyethylene glycol) and compounds that provide hydrophobic segments (for example, polypropylene glycol, poly (tetramethylene ether) glycol (PTMEG) and polybutadienediol) (for example, block copolymers of propylene oxide and ethylene oxide or block copolymers of tetrahydrofuran and ethylene oxide).

From the viewpoint of increasing dispersibility of the cellulose nanofibers in the pellets, the content of the surface treatment agent in the pellets is preferably 0.1 mass % or greater, or 0.2 mass % or greater, or 0.5 mass % or greater, while from the viewpoint of inhibiting plasticization of the molded body to maintain satisfactory strength, it is preferably 50 mass % or lower, or 30 mass % or lower, 20 mass % or lower, 18 mass % or lower, 15 mass % or lower, 10 mass % or lower or 5 mass % or lower.

From the viewpoint of increasing the dispersibility of the cellulose nanofibers in the pellets, the amount of the surface treatment agent with respect to 100 parts by mass of the cellulose nanofibers is preferably 0.1 parts by mass or greater, 0.5 parts by mass or greater or 1 parts by mass or greater, while from the viewpoint of inhibiting plasticization of the molded body and maintaining satisfactory strength it is preferably 100 parts by mass or lower, 99 parts by mass or lower, 90 parts by mass or lower, 80 parts by mass or lower, 70 parts by mass or lower, 50 parts by mass or lower or 40 parts by mass or lower.

<Antioxidant>

From the viewpoint of an effect of preventing heat-induced deterioration, the antioxidant is preferably a hindered phenol-based antioxidant, sulfur-based antioxidant or phosphorus-based antioxidant, more preferably a phosphorus-based antioxidant or hindered phenol-based antioxidant, and even more preferably a combination of a phosphorus-based antioxidant and/or hindered phenol-based antioxidant with a hindered amine-based light stabilizer (HALS).

The amount of antioxidant with respect to the total pellets is preferably 0.01 mass % or greater, 0.02 mass % or greater, 0.03 mass % or greater or 0.05 mass % or greater, and preferably 5 mass % or lower, 4 mass % or lower, 3 mass % or lower, 2 mass % or lower or 1 mass % or lower.

<Inorganic Filler>

The inorganic filler may be filamentous particles, plate-shaped particles or an inorganic pigment. Filamentous particles and plate-shaped particles may have a mean aspect ratio of 5 or greater. From the viewpoint of increasing the handleability during molding from the pellets into a molded body, the amount of inorganic filler in the pellets is preferably 0.002 parts by mass to 50 parts by mass with respect to 100 parts by mass of the thermoplastic resin.

<Lubricant Oil>

The lubricant oil may be a natural oil (engine oil, cylinder oil or the like), a synthetic hydrogen carbide (paraffinic oil, naphthene-based oil, aroma oil or the like), or a silicone-based oil. The molecular weight of the lubricant oil may be 100 or greater, 400 or greater or 500 or greater, for example, and 5,000,000 or lower, 2,000,000 or lower or 1,000,000 or lower, for example.

The melting point of the lubricant oil may be −50° C. or higher, −30° C. or higher or −20° C. or higher, for example, and 50° C. or lower, 30° C. or lower or 20° C. or lower, for example. The melting point is a temperature 2.5° C. lower than the pour point of the lubricant oil, which can be measured according to JIS K2269.

From the viewpoint of increasing the abrasion resistance, the content of the lubricant oil with respect to 100 parts by mass of the thermoplastic resin is preferably 0.1 parts by mass or greater, 0.2 parts by mass or greater or 0.3 parts by mass or greater, while from the viewpoint of avoiding unwanted softening of the molded body, it is preferably 5.0 parts by mass or lower, 4.5 parts by mass or lower or 4.2 parts by mass or lower.

The total amount of additional components in the pellets may be 0.01 mass % or greater, 0.1 mass % or greater or 1 mass % or greater, for example, and 20 mass % or lower, 10 mass % or lower or 5 mass % or lower, for example.

According to a preferred aspect, the pellets include 50 mass % to 99 mass % of the thermoplastic resin, 1 mass % to 30 mass % of the cellulose nanofibers and 0.01 mass % to 20 mass % of additional components. According to another preferred aspect, the pellets include 70 mass % to 99 mass % of the thermoplastic resin, 1 mass % to 10 mass % of the cellulose nanofibers and 0.01 mass % to 30 mass % of additional components, or 75 mass % to 99 mass % of the thermoplastic resin, 1 mass % to 5 mass % of the cellulose nanofibers and 0.01 mass % to 20 mass % of additional components.

<Resin Crystallization Temperature Lowering Agent>

A crystallization temperature lowering agent, for the purpose of the disclosure, is a compound that lowers the temperature decrease crystallization peak temperature of the resin composition of the disclosure by 5 to 30° C., as measured with a differential scanning calorimeter (DSC) (that is, the resin composition containing the crystallization temperature lowering agent has a temperature decrease crystallization peak temperature of 5 to 30° C. lower than the same resin composition without the crystallization temperature lowering agent). The reduction in the temperature decrease crystallization peak temperature by the crystallization temperature lowering agent is preferably 5° C. to 25° C. or 10° C. to 20° C. The "temperature decrease crystallization peak temperature", for the purpose of the disclosure, is the peak top temperature for the crystallization peak upon temperature decrease at 10° C./min after temperature increase to the melting point +30° C. when the thermoplastic resin is a crystalline resin, or the glass transition point +30° C. when the thermoplastic resin is an amorphous resin, using a DSC at a temperature-elevating rate of 10° C./min. By using a crystallization temperature lowering agent, when pellets of a resin composition are produced by melt mixing of a thermoplastic resin and cellulose nanofibers followed by cooling, it is possible to gently promote crystallization by cooling of the resin composition and reduce the number of voids in the pellets.

Examples of crystallization temperature lowering agents include pentaerythritol, dipentaerythritol, trimethylolethane and nigrosine, with pentaerythritol being most preferred.

The mass ratio of the crystallization temperature lowering agent with respect to 100 mass % of the resin composition is preferably 0.01 mass % to 10 mass %, 0.05 mass % to 5 mass % or 0.8 mass % to 3 mass %.

[Properties of Resin Composition]

According to one aspect, the difference Tcc−Tcp, between the temperature decrease crystallization peak temperature Tcc of the resin composition and the temperature decrease crystallization peak temperature (or the peak temperature at the highest end if multiple thermoplastic resins with different temperature decrease crystallization peak temperatures are present) Tcp of the thermoplastic resin in the resin composition, is preferably 5° C. to 30° C., 5° C. to 25° C. or 10° C. to 20° C. A resin composition with a Tcc−Tcp value in this range will tend to have accelerated crystallization by cooling of the resin composition, when pellets of the resin composition are formed by melt mixing of the thermoplastic resin and cellulose nanofibers followed by cooling, but the resin composition of the embodiment still has reduced voids in the pellets even when it is of this type.

According to one aspect, the ratio Ve/Vc between the number of voids (Ve) in the pellets and the total volume (Vc) of the cellulose nanofibers, per 100 pellets, is preferably 0 vol % to 4 vol %, 0 vol % to 3 vol % or 0 vol % to 1 vol %, from the viewpoint of obtaining pellets with low formation of voids compared to the amount of cellulose nanofibers used. The Ve/Vc is calculated by the following formula.

$$Ve/Vc=(\text{Void area percentage}\times\text{void-containing pellet ratio})/(\text{cellulose volume ratio when voids are absent}\times(100-\text{void area percentage}\times\text{void-containing pellet ratio}/100)\times100$$

The cellulose volume ratio when voids are absent is calculated from the amount and density of the components in the resin composition.

[Production of Pellets]

The pellets of the disclosure can be produced by a method of using a single-screw or twin-screw extruder for melt kneading of a mixture of a thermoplastic resin, cellulose nanofibers and optional additional components, and extrusion into a strand form, and cooling solidification in a water bath to obtain molded pellets. The following methods are methods for melt kneading a mixture of the thermoplastic resin, cellulose nanofibers and optional additional components.

(1) A method of melt kneading together all at once the thermoplastic resin, cellulose nanofibers and optional additional component.

(2) A method of melt kneading the thermoplastic resin, and optional additional components as necessary, and then adding the cellulose nanofibers and optional additional components as necessary, and further melt kneading the mixture.

(3) A method of melt kneading the thermoplastic resin, cellulose nanofibers, and optional additional components as necessary, and then further mixing cellulose nanofibers with water and optional additional components as necessary, and melt kneading them together all at once.

(4) A method of melt kneading the thermoplastic resin, and optional additional components as necessary, and then adding the thermoplastic resin, cellulose nanofibers and optional additional components mixed in a desired proportion, and further melt kneading the mixture.

(5) A method of melt kneading with the additions of (1) to (4) above, divided at the top and sides in any desired proportion, using a single-screw or twin-screw extruder.

The form of the pellets can be varied by controlling the melting temperature, screw diameter, resin throughput, number of die holes and die hole diameters in the extruder, or by controlling the air-cooling distance from the extruder die and strand bath water surface, as the cooling conditions for the strand discharged from the extruder, as well as the strand bath temperature, the strand bath immersion length and the strand take-up speed. From the viewpoint of reducing the number of void-containing pellets, it is useful to control the melt kneading temperature, the resin throughput, the number of die holes, the air-cooling distance, the strand bath temperature and the strand immersion length.

The design conditions for the extruder include the screw diameter, the number of die holes and the die hole diameters. The cooling conditions for the strand discharged from the extruder may be the ranges for the air-cooling distance from the extruder die to the strand bath water surface, the strand bath temperature, the strand bath immersion length and the strand take-up speed.

The melt kneading temperature may be adjusted depending on the type of thermoplastic resin. The strand cooling rate can be reduced by lengthening the air-cooling distance between the extruder die and the strand bath water surface, or by increasing the water temperature in the strand bath. For example, the melting temperature may be set to about 20 to 100° C. above the melting point of a crystalline thermoplastic resin or the glass transition point of an amorphous thermoplastic resin, and the cooling rate of the strand may also be controlled, in order to lengthen the time until the temperature of the resin composition during strand cooling falls from the melting temperature to below the melting point for a crystalline thermoplastic resin or the glass transition point for an amorphous thermoplastic resin.

For example, when the thermoplastic resin is an aliphatic polyamide-based resin, the conditions may be a melt kneading temperature of 180° C. to 300° C., strand cooling conditions with an air-cooling distance of 150 to 300 mm, a strand bath temperature of 40° C. and an immersion length of 300 to 500 mm.

When the thermoplastic resin is a polypropylene-based resin, the conditions may be a melt kneading temperature of 180° C. to 250° C., strand cooling conditions with an air-cooling distance of 150 to 300 mm, a strand bath temperature of 40° C. and an immersion length of 500 to 2000 mm.

The cooled strand is cut into the form of pellets. The pellet shapes may differ depending on the system of cutting during extrusion, and for example, pellets cut by the cutting method known as "underwater cutting" are usually spherical, pellets cut by the cutting method known as "hot cutting" are usually spherical or ellipsoid, and pellets cut by the cutting method known as "strand cutting" are usually cylindrical.

[Use of Pellets and Method for Producing Molded Body]

The pellets of this embodiment can be used to produce molded bodies by being supplied to various different molding methods such as extrusion molding (cold runner method or hot runner method), injection molding, injection compression molding, gas-assist injection molding, foam injection molding, ultra-thin injection molding (ultra high-speed injection molding), vacuum molding, blow molding, decorative molding, mixed materials molding, low-pressure molding or in-mold composite molding (insert molding or outsert molding). Using pellets of the disclosure is particularly advantageous for injection molding.

One aspect of the invention provides a method for producing a molded body, which comprises:

a step of preparing pellets according to the disclosure, and a step of injection molding the pellets in a mold to obtain a molded body. From the viewpoint of a particularly notable advantage of reducing yellowing and outer appearance defects in the molded body by using the pellets of the disclosure, preferred injection molding machines are hydraulic and electric or hydraulic/electric hybrid injection molding machines, for the drive system, with a plunger-type, pre-plasticating-type or screw-type injection molding machine as the injection type. The preferred molding conditions, from the same viewpoint, are a melting temperature of 20 to 100° C. higher than the melting point for a crystalline thermoplastic resin, or the glass transition point for an amorphous thermoplastic resin, and a mold temperature of 50 to 200° C. lower than the melting point for a crystalline thermoplastic resin or the glass transition point for an amorphous thermoplastic resin.

The molded body may be provided in various shapes for different molded bodies, such as a sheet, film, fibers, solid or hollow form. Numerous examples may be mentioned as uses for the molded body, such as a material for industrial machinery parts (for example, electromagnetic device housings, roll materials, transport arms or medical equipment members), common machine parts, automobile/railway/vehicle parts (for example, outer platings, chassis, aerodynamic members, seats or friction materials for transmission interiors), ship members (for example, hulls or seats), aviation-related parts (for example, fuselages, wings, tail units, moving vanes, fairings, cowls, doors, seats or interior finishing materials), spacecraft, artificial satellite members (motor cases, wings, body frames or antennae), electronic and electrical components (for example, personal computer cases, cellular phone cases, OA devices, AV devices, telephone sets, facsimiles, household electrical appliances or toy parts), construction and civil engineering materials (for example, reinforcing steel substitute materials, truss structures or suspension bridge cables), subsistence items, sports and leisure goods (for example, golf club shafts, fishing rods or tennis and badminton rackets), and wind power generation housing members, as well as members of containers and packaging materials, including high-pressure containers filled with hydrogen gas or the like to be used for fuel cells.

When the molded body is provided in the form of a resin composite film, it can be suitably used for reinforcement of a laminated sheet in a printed circuit board. In addition, it can be suitably applied in, for example, insulating tubes, insulating levers, arc extinguishing plates, operating rods, insulating spacers, cases, wind channels, end bells and wind uke for generators, transformers, rectifiers, circuit breakers and controllers, switch boxes and cases for standard electrical goods, cross bars, insulating shafts, fan blades, mechanism components, transparent resin bases, speaker diaphragms, eta diaphragms, television screens and fluorescent lamp covers, antennas, horn covers, radomes, cases, mechanism components and circuit boards for communication devices and aerospace purposes, aircraft, rockets, electronic device parts for aircraft, rockets and artificial satellites, railway parts, ship parts, bathtubs, wastewater treatment tanks, corrosion-resistant equipment, chairs, safety helmets, pipes, tank lorries, cooling towers, breakwaters, underground tanks and containers.

From the viewpoint of exhibiting a superior effect by excellent heat resistance of the molded body comprising the cellulose nanofibers, it is preferably used in an automobile member or electronic product member that requires resin molding.

EXAMPLES

The embodiment of the present invention will now be described in greater detail by examples, with the understanding that the invention is not limited to these examples. The major values for the physical properties were measured by the following methods.

[Evaluation Methods]
<Temperature Decrease Cry Stalli/Ation Peak Temperature of Thermoplastic Resin and Resin Composition This was measured by the following method.
Apparatus: Differential scanning calorimeter (DSC8500 by Perkin Elmer)
Conditions:
  Cell: Aluminum
  Carrier gas: Nitrogen (50 ml/min)
  Temperature program: 20° C.→250° C. (100° C./min)
  250° C. (held for 5 minutes)
  250° C.→20° C. (10° C./min)
<Ratio of Total Volume (Ve) of Voids and Total Volume (Vc) of Cellulose Nanofibers, Per 100 Pellets>

This was calculated by the following formula.

$Ve/Vc$=(Void area percentage×void-containing pellet ratio)/(cellulose volume ratio without voids×(100–void area percentage×void-containing pellet ratio/100)×100

The void area percentage and void-containing pellet percentage were measured in the following manner.

The cellulose volume ratio when voids are absent was calculated from the amount and density of the components in the resin composition. The density was calculated to be 1.14 g/cm$^3$ for polyamide 6 (PA6), 0.90 g/cm$^3$ for polypropylene (PP), 0.87 g/cm$^3$ for maleic anhydride-modified ethylene-octene copolymer (MEOR), 1.50 g/cm$^3$ for cellulose nanocrystals (CNC) and cellulose nanofibers (CNF), 1.43 g/cm$^3$ for hydrophobized cellulose nanofibers (hydrophobized CNF) and 1.40 g/cm$^3$ for pentaerythritol (PET).
<Number of Void-Containing Pellets Per 100 Pellets (Void-Containing Pellet Ratio)>

Each of 100 randomly selected pellets was cut at the center in the pellet MD direction and flattened with a microtome (HM340 by Thermo Fisher Scientific) to obtain a TD cross-section. A morphological image of the TD cross-section was photographed with a microscope (VHX-5000 by Keyence Corp.) at 20× magnification (10 mm×14 mm observation field), and pellets with visible voids were identified as void-containing pellets. The number of void-containing pellets in 100 pellets was counted as the void-containing pellet ratio.
<Ratio of Void Area with Respect to Cross-Sectional Area of Pellet TD Cross-Section in Void-Containing Pellets (Void Area Percentage)>

Using the same method as for the evaluation under <Number of void-containing pellets per 100 pellets>, 100 pellets were selected and their TD cross-sectional shapes were observed. The void area for the TD cross-section of the void-containing pellets was measured using software included with the microscope, the percentage of the void area with respect to 100% as the total cross-sectional area for each TD cross-section was calculated, and the average value for all of the void-containing pellets was recorded as the void area percentage. The void area percentage is defined as 0% when not even a single void-containing pellet is present in 100 randomly selected pellets.
<Angle Between Normal to Cut Surface of Pellets and Pellet MD Direction (Pellet Cut Surface Inclination Angle)>

First, each of 10 randomly selected pellets was cut in a selected direction through the center section in the TD direction and in such a manner that the angle of the cut surface of the pellet was the maximum inclination angle, and then flattened with a microtome (HM340 by Thermo Fisher Scientific) to obtain an MD cross-section. A morphological image of the MD cross-section was photographed with a microscope (VHX-5000 by Keyence Corp.) at 20× magnification (observation field: 10 mm×14 mm). The pellet MD direction axis and the normal to a line segment corresponding to the edge in the pellet MD direction were traced in the morphological image, and the angle formed between the pellet MD direction axis and the normal was measured. The number-average value for the 10 pellets was calculated as the pellet cut surface inclination angle.
<Molded Body Appearance>

The pellets were injection molded into the shape of a multipurpose test piece for ISO 294-3. The surfaces of 30 fabricated multipurpose test pieces were visually observed and evaluated on the following scale.
  Good: No silver streaks
  Acceptable: ≥1 and <10 silver streaks
  Poor: ≥10 silver streaks
<Molding Cycle>

The pellets were injection molded into the shape of a multipurpose test piece for ISO 294-3. The average value for the molding cycle (sec) when fabricating 30 test pieces was recorded as the molding cycle.
<Yellowness Index (YI)>

The pellets were injection molded into the shape of a multipurpose test piece for ISO 294-3, and the YI value was measured according to JIS K7373.
[Materials]
<Thermoplastic Resin>
Polyamide 6 (PA6)
  UBE Nylon 1013B (Ube Industries, Ltd.)
  Carboxy-terminal group ratio: ([COOH]/[total terminal groups])=0.6
  Viscosity number (VN) of polyamide measured in 96 mass % concentration sulfuric acid=95
Polypropylene (PP)
  NOVATEC PP MA1B (product of Japan Polypropylene Corp.)
  MFR (230° C., 2.16 kgf)=21 g/10 min
<Elastomer>
Maleic Anhydride-Modified Ethylene-Octene Copolymer (MEOR)
  FUSABOND MN-493D (Dow-DuPont)
  MFR (190° C., 2.16 kgf)=1.2 g/10 min
  Octene content=28 mass %
  Melting point=55° C. (DSC: temperature-elevating rate=10° C./min)
  Maleic anhydride addition=1.0 mass %
<Cellulose>

[Preparation Example 1] Cellulose Nanocrystals (CNC)

Commercially available DP pulp (mean polymerization degree: 1600) was cut and hydrolyzed at 105° C. for 30 minutes in 10 mass % aqueous hydrochloric acid. The obtained acid-insoluble residue was filtered, rinsed and pH-adjusted to prepare a crystalline cellulose dispersion with a solid concentration of 14 mass % and a pH of 6.5. The crystalline cellulose dispersion was spray-dried to obtain dried crystalline cellulose. Next, the obtained dried product was supplied to an air flow-type pulverizer (Model STJ-400 by Seishin Enterprise Co., Ltd.) at a feed rate of 10 kg/hr, and pulverized to obtain CNC as crystalline cellulose fine powder.

When the properties of the obtained CNC were evaluated, the diameter was 30 nm and the L/D was 8.

Polyethylene glycol with a molecular weight of 20,000 (PEG20000) was added to an aqueous dispersion of the obtained CNC at 5 parts by mass with respect to 100 parts by mass of CNC, and then a revolving/rotating stirrer (V-mini300 by EME Co.) was used for vacuum drying at about 40° C. to obtain CNC powder.

[Preparation Example 2] Cellulose Nanofibers (CNF)

After cutting linter pulp, an autoclave was used to heat it for 3 hours in hot water at 120° C. or higher to remove the hemicellulose portion and obtained refined pulp, which was pressed and beaten into highly chopped fibers and fibrils to a solid content of 1.5 mass % in purified water, and then defibrated with a high-pressure homogenizer (10 times at an operating pressure of 85 MPa) at the same concentration to obtain defibrated cellulose. For the beating treatment, a disc refiner was used for 4 hours of treatment with a high-cutting beating blade (hereunder referred to as "cutting blade"), and then a high-defibrating beating blade (hereunder referred to as "defibrating blade") was used for another 1.5 hours of beating.

When the properties of the obtained CNF were evaluated, the diameter was 90 nm and the L/D was ≥30 (approximately 300).

PEG20000 was added to an aqueous dispersion of the obtained CNF at 5 parts by mass with respect to 100 parts by mass of CNF, and then a revolving/rotating stirrer (V-mini300 by EME Co.) was used for vacuum drying at about 40° C. to obtain CNF powder.

[Preparation Example 3] Hydrophobized CNF (Hydrophobized CNF)

(Defibrating Step)

Linter pulp used as starting material was stirred for 1 hour at ordinary temperature, 500 rpm in a uniaxial stirrer (DKV-1 φ125 mm Dissolver by Aimex Co.), in dimethyl sulfoxide (DMSO). The mixture was then fed to a bead mill (NVM-1.5 by Aimex Co.) using a hose pump and circulated for 120 minutes with DMSO alone, to obtain a defibrated slurry.

(Defibrating and Acetylating Step)

After adding 11 parts by mass of vinyl acetate and 1.63 parts by mass of sodium hydrogencarbonate to 100 parts by mass of the defibrated slurry in a bead mill apparatus, the mixture was further circulated for 60 minutes to obtain a hydrophobized CNF slurry.

The rotational speed of the bead mill during circulation was 2500 rpm, and the circumferential speed was 12 m/s. The beads used were zirconia, φ2.0 mm, and the fill factor was 70% (with a slit gap of 0.6 mm in the bead mill). Also during the circulation, the slurry temperature was controlled to 40° C. with a chiller, for absorption of the heat release by abrasion.

After adding 192 parts by mass of purified water to the obtained hydrophobized CNF slurry, with respect to 100 parts by mass of the defibrated slurry, and thoroughly stirring the mixture, it was placed in a dehydrator and concentrated. The obtained wet cake was then re-dispersed in the same amount of purified water and stirred and concentrated, and this rinsing procedure was repeated a total of 5 times.

When the properties of the hydrophobized CNF were evaluated, the diameter was 65 nm and the L/D was ≥30 (approximately 450).

PEG20000 was added to an aqueous dispersion of the obtained hydrophobized CNF (solid content: 10 mass %) at 5 parts by mass with respect to 100 parts by mass of hydrophobized CNF, and then a revolving/rotating stirrer (V-mini300 by EME Co.) was used for vacuum drying at about 40° C. to obtain hydrophobized CNF powder.

<Resin Crystallization Temperature Lowering Agent>

Pentaerythritol (PET) (Tokyo Kasei Kogyo Co., Ltd.) CAS: 115-77-5

Example 1

There were mixed 90 parts by mass of PA6 and 10 parts by mass of the CNF obtained in Preparation Example 2, and the mixture was melt kneaded at a kneading temperature of 250° C. using a twin-screw extruder (TEM-37SS by Toshiba Machine Co., Ltd., screw diameter: 37 mm) and extruded into the form of a strand. The resin throughput of the twin-screw extruder was 20 kg/h, and the number of die holes was three. The distance to the strand bath water surface was adjusted by the die holes, and the air-cooling distance from the strand leaving the die until landing on the water was adjusted to 150 mm. After cooling in the strand bath adjusted to a water temperature of 40° C., with an immersion length of 400 mm, it was cut with a strand cutter to obtain pellets.

Comparative Example 1 and Example 2

Pellets were obtained in the same manner as Example 1, except that the pellet production conditions were changed as shown in Table 1.

Comparative Examples 2 and 3, and Examples 3 to 7 and 9

Pellets were obtained in the same manner as Example 1, except that the twin-screw extruder was changed to a TEM-75SS by Toshiba Machine Co., Ltd. (screw diameter: 75 mm), and the pellet production conditions were changed as shown in Table 1.

Example 8

Pellets were obtained in the same manner as Example 3, except that the pellet production conditions were changed as shown in Table 1, and the take-up speed of the strand cutter was adjusted downward, with the pellet TD cross-section short diameter at the value shown in Table 1.

Example 10

Pellets were obtained in the same manner as Example 3, except that 70 parts by mass of PA6, 20 parts by mass of MEOR and 10 parts by mass of CNF were mixed and melt kneaded, and the pellet production conditions were changed as shown in Table 1.

Example 11

Pellets were obtained in the same manner as Example 3, except that 90 parts by mass of PA6, 5 parts by mass of the CNC obtained in Preparation Example 1 and 5 parts by mass of the CNF obtained in Preparation Example 2 were mixed and melt kneaded, and the pellet production conditions were changed as shown in Table 1.

Examples 12 and 13

Pellets were obtained in the same manner as Example 3, except that 90 parts by mass of PA6 and 10 parts by mass of the hydrophobized CNF obtained in Preparation Example 3 were mixed and melt kneaded, and the pellet production conditions were changed as shown in Table 1.

Example 14

Pellets were obtained in the same manner as Example 3, except that 89 parts by mass of PA6, 1 part by mass of PET, and 10 parts by mass of the hydrophobized CNF obtained in Preparation Example 3 were mixed and melt kneaded, and the pellet production conditions were changed as shown in Table 1.

Comparative Example 4 and Example 15

Pellets were obtained in the same manner as Example 3, except that 90 parts by mass of PP and 10 parts by mass of the CNF obtained in Preparation Example 2 were mixed and melt kneaded at a kneading temperature of 200° C., and the pellet production conditions were changed as shown in Table 1.

Reference Example 1

Pellets were obtained in the same manner as Example 1, except that polyamide (PA) alone was melt kneaded, without using cellulose aggregates in step 3.

The results are shown in Table 1.

TABLE 1

| | | | Pellet production conditions | | | | | | |
|---|---|---|---|---|---|---|---|---|---|
| | Resin | Cellulose | Resin crystallization temperature lowering agent | Twin-screw extruder screw diameter [mm] | Resin throughput [kg/hr] | Number of die holes | Resin throughput at die hole periphery [kg/hr] | Air-cooling distance [mm] | Strand bath water temperature [° C.] | Immersion length [mm] |
| Ref. Ex. 1 | PA6 | No | — | 37 | 60 | 3 | 20.0 | 150 | 25 | 400 |
| Comp. Ex. 1 | PA6 | CNF | — | 37 | 60 | 3 | 20.0 | 150 | 25 | 400 |
| Example 1 | PA6 | CNF | — | 37 | 60 | 3 | 20.0 | 150 | 40 | 400 |
| Example 2 | PA6 | CNF | — | 37 | 60 | 3 | 20.0 | 200 | 40 | 400 |
| Comp. Ex. 2 | PA6 | CNF | — | 75 | 600 | 30 | 20.0 | 150 | 25 | 400 |
| Comp. Ex. 3 | PA6 | CNF | — | 75 | 600 | 30 | 20.0 | 150 | 40 | 400 |
| Example 3 | PA6 | CNF | — | 75 | 600 | 30 | 20.0 | 200 | 40 | 400 |
| Example 4 | PA6 | CNF | — | 75 | 600 | 30 | 20.0 | 200 | 40 | 300 |
| Example 5 | PA6 | CNF | — | 75 | 750 | 30 | 25.0 | 200 | 40 | 300 |
| Example 6 | PA6 | CNF | — | 75 | 600 | 30 | 20.0 | 200 | 60 | 300 |
| Example 7 | PA6 | CNF | — | 75 | 750 | 30 | 25.0 | 200 | 60 | 300 |
| Example 8 | PA6 | CNF | — | 75 | 600 | 30 | 20.0 | 200 | 60 | 300 |
| Example 9 | PA6 | CNF | — | 75 | 600 | 30 | 20.0 | 150 | 25 | 1300 |
| Example 10 | PA6/MEOR | CNF | — | 75 | 750 | 30 | 25.0 | 200 | 40 | 300 |
| Example 11 | PA6 | CNF/CNC | — | 75 | 600 | 30 | 20.0 | 200 | 60 | 300 |
| Example 12 | PA6 | Hydrophobized CNF | — | 75 | 600 | 30 | 20.0 | 200 | 60 | 300 |
| Example 13 | PA6 | Hydrophobized CNF | — | 75 | 750 | 30 | 20.0 | 200 | 60 | 300 |
| Example 14 | PA6 | CNF | PET | 75 | 750 | 30 | 20.0 | 200 | 40 | 1300 |
| Comp. Ex. 4 | PP | CNF | — | 75 | 600 | 30 | 20.0 | 150 | 25 | 1300 |
| Example 15 | PP | CNF | — | 75 | 600 | 30 | 20.0 | 200 | 40 | 1300 |

| | Pellets | | | | Evaluation | | | | | |
|---|---|---|---|---|---|---|---|---|---|---|
| | Void-containing pellet proportion [number] | Void area percentage of TD cross section [%] | Angle formed between MD direction and normal to TD cross-section [°] | Short diameter of TD cross-section [mm] | Outer appearance of molded body | Molding cycle [sec] | YI | Void/CNF volume ratio | Ve/Vc | Tcc-Tcp [° C.] |
| Ref. Ex. 1 | 0 | 0 | 2 | 2.3 | Good | 71 | 5 | 0.00 | 0.00 | — |
| Comp. Ex. 1 | 42 | 4.3 | 3 | 2.1 | Poor | 75 | 65 | 0.58 | 23.60 | 8.5 |
| Example 1 | 8 | 3.5 | 2 | 1.7 | Acceptable | 73 | 55 | 0.47 | 3.61 | 9.1 |
| Example 2 | 0 | 0 | 3 | 2.0 | Good | 76 | 52 | 0.00 | 0.00 | 8.8 |
| Comp. Ex. 2 | 85 | 11.8 | 7 | 2.4 | Poor | 53 | 56 | 1.72 | 143.17 | 8.3 |
| Comp. Ex. 3 | 17 | 4.9 | 13 | 2.3 | Poor | 54 | 50 | 0.66 | 10.79 | 9.4 |
| Example 3 | 10 | 4.2 | 13 | 2.2 | Acceptable | 54 | 44 | 0.56 | 5.42 | 9.9 |
| Example 4 | 6 | 3.8 | 12 | 2.3 | Good | 55 | 44 | 0.51 | 2.93 | 10.2 |
| Example 5 | 9 | 4.6 | 12 | 2.6 | Acceptable | 52 | 45 | 0.62 | 5.34 | 9.0 |
| Example 6 | 0 | 0 | 16 | 2.6 | Good | 50 | 42 | 0.00 | 0.00 | 8.3 |
| Example 7 | 0 | 0 | 16 | 2.4 | Good | 53 | 43 | 0.00 | 0.00 | 8.7 |
| Example 8 | 9 | 7.2 | 18 | 5.2 | Acceptable | 55 | 45 | 1.00 | 8.38 | 9.1 |
| Example 9 | 8 | 3.3 | 3 | 1.2 | Acceptable | 70 | 54 | 0.44 | 3.40 | 8.8 |
| Example 10 | 2 | 2.2 | 13 | 2.5 | Good | 60 | 40 | 0.36 | 0.60 | 8.2 |

TABLE 1-continued

| | | | | | | | | | |
|---|---|---|---|---|---|---|---|---|---|
| Example 11 | 0 | 0 | 14 | 1.9 | Good | 51 | 67 | 0.00 | 0.00 | 9.8 |
| Example 12 | 0 | 0 | 15 | 2.2 | Good | 54 | 29 | 0.00 | 0.00 | 12.3 |
| Example 13 | 5 | 1.3 | 15 | 4.8 | Good | 52 | 33 | 0.17 | 0.84 | 11.8 |
| Example 14 | 0 | 0 | 18 | 4.5 | Good | 48 | 27 | 0.00 | 0.00 | 3.4 |
| Comp. Ex. 4 | 97 | 14.1 | 15 | 2.3 | Poor | 61 | 37 | 2.63 | 203.47 | 5.4 |
| Example 15 | 7 | 8.6 | 16 | 2.8 | Acceptable | 58 | 28 | 1.51 | 7.78 | 5.5 |

Based on the results shown in Table 1, Examples 1 to 15 were cellulose nanofiber-containing pellets but had low yellowing of the molded bodies, and also satisfactory outer appearances. For example, Examples 2, 6, 7, 11 and 12, which had relatively high water temperatures and slow solidification speeds for the thermoplastic resins, had void-containing pellet percentages of 0% and void generation reduced to a level equivalent to Reference Example 1 which did not use cellulose nanofibers, while having satisfactory outer appearance comparable even to Reference Example 1 which did not use cellulose nanofibers. In Example 8, which had increased pellet sizes, and Examples 10 and 15 which had different types of thermoplastic resins, the resulting molded bodies had low yellowing and satisfactory outer appearance. Yellowing of the molded bodies was especially low in Examples 12 and 13 which used hydrophobized CNF. In Example 14, which had addition of a resin crystallization temperature lowering agent, the molding cycle was further shortened and the resulting molded body had low yellowing.

INDUSTRIAL APPLICABILITY

The pellets of the present invention are useful for production of a molded body having a satisfactory outer appearance and reduced yellowing.

REFERENCE SIGNS LIST 1, 2, 3 Pellet
S1, S2 Pellet cut surface
L Pellet MD direction
L1, L2 Normal direction
θ1, θ2 Angle

The invention claimed is:

1. Pellets of a resin composition comprising a thermoplastic resin and cellulose nanofibers, the pellets having a cylindrical or elliptic cylindrical shape, wherein:
    (i) the number of void-containing pellets per 100 pellets is 10 or less provided that when the number is other than 0, the void-containing pellets have a percentage of the void area with respect to the total area of a cylindrical cross-section of at least 1.3% to 4% or lower, wherein the void area is visible in the center of a transverse-cut surface of the cylindrical cross-section;
    (ii) the thermoplastic resin comprises a crystalline resin; and
    (iii) the cellulose nanofibers are hydrophobized cellulose nanofibers having a fiber diameter of 50 to 1000 nm and a fiber length/fiber diameter (L/D) ratio of 30 or greater.

2. Pellets according to claim 1, wherein the pellets have been cut from a strand and has a longitudinal direction corresponding to a machine direction (MD) upon forming the strand and a radial direction corresponding to a transverse direction (TD) upon forming the strand.

3. Pellets according to claim 1, wherein the number of void-containing pellets per 100 pellets is 1 or less.

4. Pellets according to claim 1, wherein the pellets have been cut from a strand and has a longitudinal direction corresponding to a machine direction (MD) upon forming the strand and a radial direction corresponding to a transverse direction (TD) upon forming the strand, and the angle formed by the normal to the cut surface of the pellets with respect to the longitudinal direction of the pellets is 5° to 30°.

5. Pellets according to claim 1, wherein the pellets have been cut from a strand and has a longitudinal direction corresponding to a machine direction (MD) upon forming the strand and a radial direction corresponding to a transverse direction (TD) upon forming the strand, and the short diameters of the radial cross-sections of the pellets are 2 mm to 5 mm.

6. Pellets according to claim 1, which comprise the cellulose nanofibers at 0.1 to 30 mass %.

7. Pellets according to claim 1, wherein the thermoplastic resin is a polyamide-based resin and/or polyolefin-based resin.

8. Pellets according to claim 1, which further comprise an elastomer.

9. Pellets according to claim 1, which further comprise cellulose nanocrystals having diameters of 100 nm or smaller and an L/D of less than 30, or cellulose microfibers with fiber diameters of greater than 1 μm and up to 50 μm, or a mixture of the same.

10. Pellets according to claim 1, wherein the difference Tcc−Tcp between the temperature decrease crystallization peak temperature Tcc of the resin composition measured with a differential scanning calorimeter and the temperature decrease crystallization peak temperature Tcp of the thermoplastic resin measured with a differential scanning calorimeter, is 5° C. to 30° C.

11. Pellets according to claim 1, wherein the ratio Ve/Vc of the total volume (Ve) of pellet voids and the total volume (Vc) of the cellulose nanofibers, per 100 pellets, is 0 vol % to 4 vol %.

12. Pellets according to claim 1, wherein:
    the resin composition further comprises a resin crystallization temperature lowering agent, and
    the resin crystallization temperature lowering agent is a compound that lowers the temperature decrease crystallization peak temperature of the resin composition by 5 to 30° C. as measured with a differential scanning calorimeter.

13. A method for producing a molded body, which comprises:
    a step of preparing pellets according to claim 1, and
    a step of injection molding the pellets in a mold to obtain a molded body.

14. Pellets according to claim 1, wherein the pellets have been cut from a strand and has a longitudinal direction corresponding to a machine direction (MD) upon forming the strand and a radial direction corresponding to a transverse direction (TD) upon forming the strand, and a length of the pellets is 2 to 5 mm.

* * * * *